United States Patent
Tanaka

(10) Patent No.: US 10,757,284 B2
(45) Date of Patent: Aug. 25, 2020

(54) IMAGE FORMING APPARATUS, STORAGE MEDIUM, AND CONTROL METHOD THAT SWITCHES FROM SLEEP MODE TO STANDBY MODE UPON DETECTING A JOB DATA OF A REGISTERED USER

(71) Applicant: SHARP KABUSHIKI KAISHA, Sakai, Osaka (JP)

(72) Inventor: Kenji Tanaka, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/210,992

(22) Filed: Dec. 5, 2018

(65) Prior Publication Data

US 2019/0182400 A1 Jun. 13, 2019

(30) Foreign Application Priority Data

Dec. 7, 2017 (JP) .................. 2017-234816

(51) Int. Cl.
*G06K 15/00* (2006.01)
*H04N 1/00* (2006.01)
*H04N 1/44* (2006.01)

(52) U.S. Cl.
CPC ..... *H04N 1/00896* (2013.01); *H04N 1/00251* (2013.01); *H04N 1/00336* (2013.01); *H04N 1/442* (2013.01)

(58) Field of Classification Search
None
See application file for complete search history.

(56) References Cited

U.S. PATENT DOCUMENTS

| 9,406,006 B2 | 8/2016 | Ono et al. |
| 2006/0092455 A1* | 5/2006 | Maeda ................ H04N 1/4406 358/1.15 |
| 2014/0104630 A1 | 4/2014 | Baba |
| 2015/0234474 A1 | 8/2015 | Yokoyama et al. |
| 2015/0338899 A1* | 11/2015 | Kurahashi ............ B41J 29/46 307/117 |
| 2017/0264786 A1* | 9/2017 | Nishida ............... G06F 3/1222 |

FOREIGN PATENT DOCUMENTS

| CN | 103731575 A | 4/2014 |
| CN | 104853054 A | 8/2015 |
| JP | 2015-011537 A | 1/2015 |

\* cited by examiner

*Primary Examiner* — Henok Shiferaw
(74) *Attorney, Agent, or Firm* — ScienBiziP, P.C.

(57) ABSTRACT

An image forming apparatus includes a CPU and a camera. In the image forming apparatus, the camera takes a facial image of a user approaching the image forming apparatus, and on the basis of the facial image, face authentication is executed. Further, in a case where it has been determined as a result of the face authentication that the user approaching the image forming apparatus is a registered user, it is determined whether there is registered job data registered by the registered user. The image forming apparatus is switched from a power-saving mode to a normal mode in a case where it has been determined that there is registered job data of the user approaching the image forming apparatus.

8 Claims, 11 Drawing Sheets

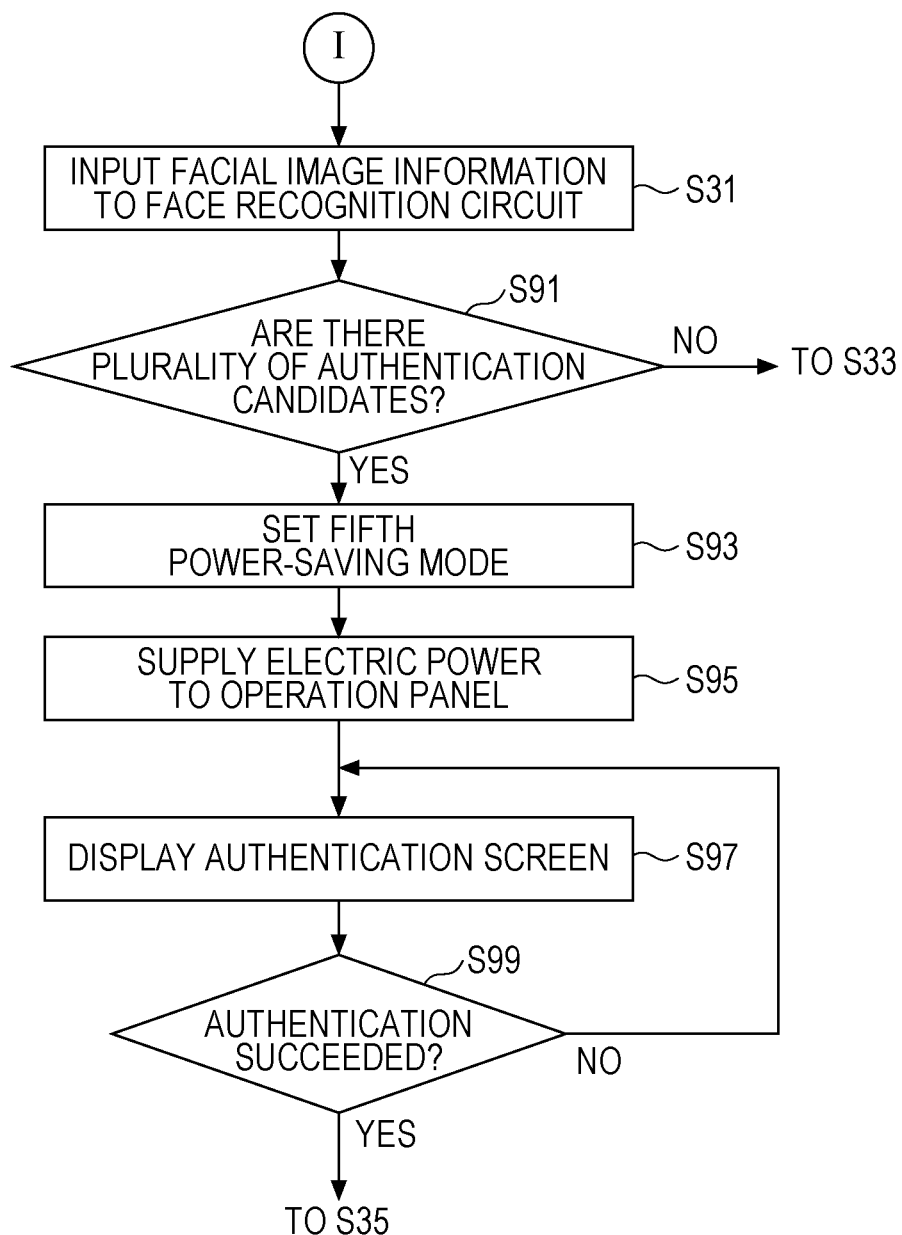

IMAGE FORMING APPARATUS, STORAGE MEDIUM, AND CONTROL METHOD THAT SWITCHES FROM SLEEP MODE TO STANDBY MODE UPON DETECTING A JOB DATA OF A REGISTERED USER

BACKGROUND

1. Field

The present disclosure relates to image forming apparatuses, control programs, and control methods and, for example in particular, to an image forming apparatus, a control program, and a control method having a power-saving state in which power consumption is limited and a normal state in which power consumption is not limited.

2. Description of the Related Art

An example of this type of related art is disclosed in Japanese Unexamined Patent Application Publication No. 2015-11537. An image forming apparatus of the related art is switchable between a standby mode in which actions are executable and a sleep mode in which some of the actions are inexecutable, and includes a human sensor that detects a person who is in a predetermined detecting region and a first imaging section that takes an image of a person who is in a predetermined photographing range. The image forming apparatus of the related art is configured such that when the human sensor detects a person in the sleep mode, electric power is supplied to the first imaging section, that when it is determined, on the basis of an image taken by the first imaging section, that the person is approaching, a switch from the sleep mode to the standby mode is made by supplying electric power that is necessary for operation.

However, the image forming apparatus of the related art is switched from the sleep mode to the standby mode even in a case where a person who does not use the apparatus only passes in front of or by the apparatus. This causes the image forming apparatus to be frequently switched to the standby mode even in a case where the image forming apparatus is not used, undesirably making waste of electric power.

It is therefore desirable to provide a novel image forming apparatus, a novel control program, and a novel control method.

It is also desirable to provide an image forming apparatus, a control program, and a control method that make it possible to achieve a reduction in power consumption and make an appropriate transition from a power-saving mode to a normal mode.

SUMMARY

According to an aspect of the disclosure, there is provided an image forming apparatus including a memory section that is able to store therein a facial image of a registered user and predetermined registered job data registered by the registered user and having a power-saving state in which an amount of power consumption is limited to a predetermined value or smaller and a normal state in which the amount of power consumption is not limited, including a first determination unit, a second determination unit, a third determination unit, and a state setting unit. The first determination unit determines whether a user is present in a first range within an area around the image forming apparatus. In a case where the first determination unit has determined that a user is present in the first range, the second determination unit determines whether the user is the registered user. In a case where the second determination unit has determined that the user is the registered user, the third determination unit determines whether the memory section has stored therein the registered job data registered by the registered user. The state setting unit sets the normal state in a case where the third determination unit has determined in the power-saving state that the memory section has stored therein the registered job data registered by the registered user.

According to an aspect of the disclosure, there is provided a non-transitory storage medium having stored thereon a control program for an image forming apparatus including a memory section that is able to store therein a facial image of a registered user and predetermined registered job data registered by the registered user and having a power-saving state in which an amount of power consumption is limited to a predetermined value or smaller and a normal state in which the amount of power consumption is not limited, the control program causing a processor of the image forming apparatus execute a process including: (a) determining whether a user is present in a first range within an area around the image forming apparatus; (b) in a case where, in (a), it has been determined that a user is present in the first range, determining whether the user is the registered user; (c) in a case where, in (b), it has been determined that the user is the registered user, determining whether the memory section has stored therein the registered job data registered by the registered user; and (d) setting the normal state in a case where, in (c), it has been determined in the power-saving state that the memory section has stored therein the registered job data registered by the registered user.

According to an aspect of the disclosure, there is provided a control method by which a processor of an image forming apparatus including a memory section that is able to store therein a facial image of a registered user and predetermined registered job data registered by the registered user and having a power-saving state in which an amount of power consumption is limited to a predetermined value or smaller and a normal state in which the amount of power consumption is not limited executes operations including: (a) determining whether a user is present in a first range within an area around the image forming apparatus; (b) in a case where, in (a), it has been determined that a user is present in the first range, determining whether the user is the registered user; (c) in a case where, in (b), it has been determined that the user is the registered user, determining whether the memory section has stored therein the registered job data registered by the registered user; and (d) setting the normal state in a case where, in (c), it has been determined in the power-saving state that the memory section has stored therein the registered job data registered by the registered user.

The above-described aspects, other aspects, features, and advantages of the present disclosure will further be clarified from the following embodiments descried in detail with reference to the drawings.

BRIEF DESCRIPTION OF THE DRAWINGS

FIG. 14 is a flow chart showing an example of a power-supply control process according to the third embodiment.

DESCRIPTION OF THE EMBODIMENTS

First Embodiment

Figure 1:
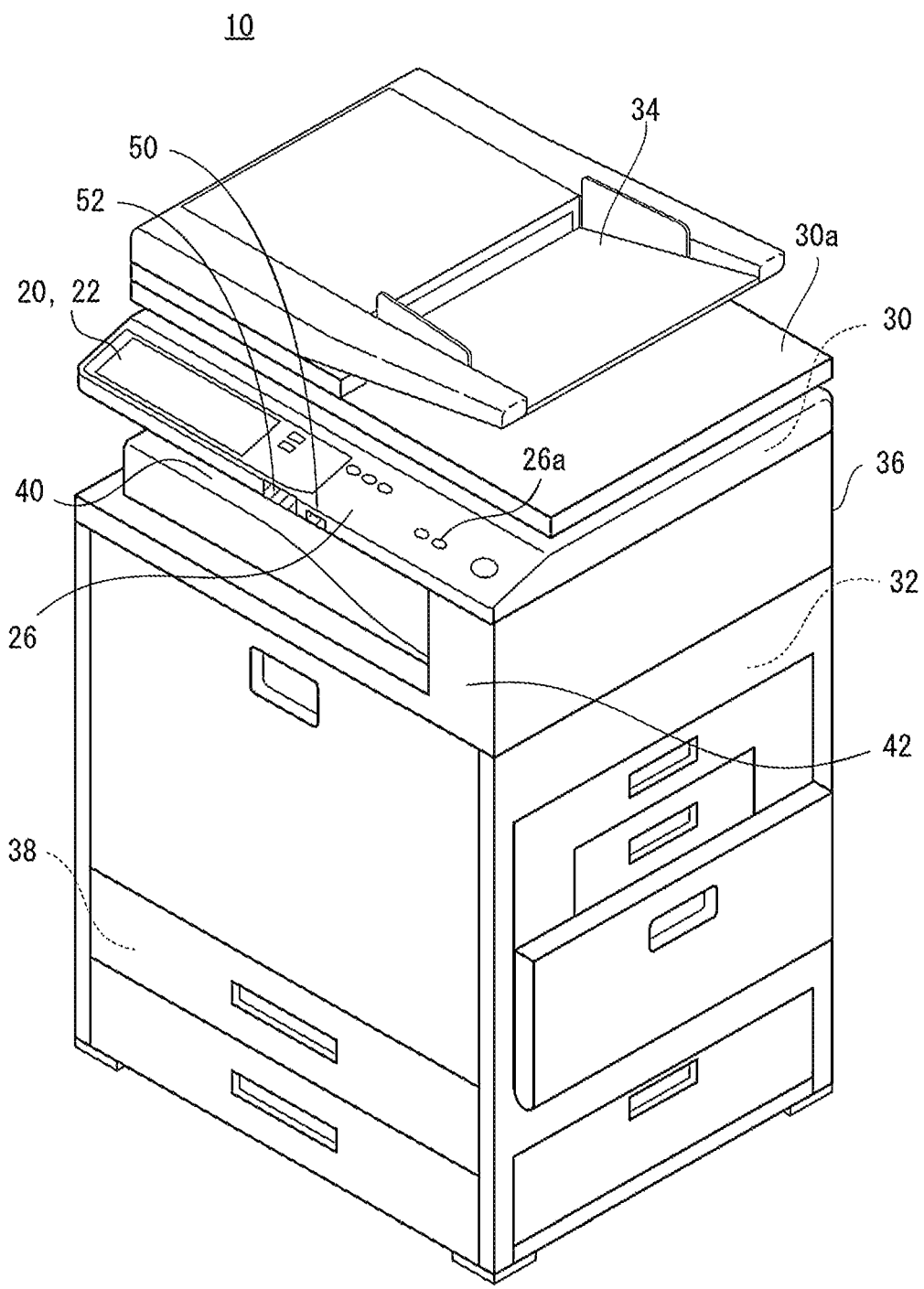
FIG. 1 is a perspective view showing an external appearance of an image forming apparatus according to an embodiment of the present disclosure.

FIG. 1 is a front view showing an external configuration of an image forming apparatus 10 according to an embodiment of the present disclosure. In a first embodiment, as shown in FIG. 1, the image forming apparatus 10 is an MFP (multifunctional peripheral) having a copy function, a printer function, a scanner function, a facsimile function, and similar functions. It should be noted that the present disclosure is applicable not only to an MFP but also to another image forming apparatus such as a copier (copy machine), a printing apparatus (printer), or a facsimile.

The front-back direction (depth direction) of the image forming apparatus 10 and its constituent members is defined assuming that the front surface (front side) is a surface that faces the place where a user stands, i.e. a surface on which the after-mentioned operation panel 26 is provided, and the right-left direction (transverse direction) of the image forming apparatus 10 and its constituent members is defined with reference to a state of the image forming apparatus 10 as seen from a user.

The image forming apparatus 10 includes an apparatus body 36 including an image reading section 30, an image forming section 32, a manual paper feeding section 34, a paper feeding device 38, and a paper output tray 40.

The image reading section 30 includes a document platen made of a transparent material and is built in the apparatus 36. The image reading section 30 has a document holding cover 30a openably and closably attached above the document platen via a hinge or the like. The document holding cover 30a is provided with the manual paper feeding section 34. Further, the document holding cover 30a is provided with an ADF (automatic document feeder) that automatically feeds a document placed on the manual paper feeding section 34.

Further, the image reading section 30 includes a light source, a plurality of mirrors, an imaging lens, a line sensor, and the like. The image reading section 30 uses the light source to expose a document surface to light and uses the plurality of mirrors to guide, toward the imaging lens, reflected light reflected from the document surface. Then, the imaging lens causes the reflected light to form an image on a light receiving element of the line sensor. The line sensor detects the luminance or chromaticity of the reflected light having formed the image on the light receiving element and generates read image data based on an image on the document surface. As the line sensor, a CCD (charge-coupled device), a CIS (contact image sensor), or the like is used.

The image forming section 32 is built in the apparatus body 36 and provided below the image reading section 30. The image forming section 32 includes a photosensitive drum, a charging device, an exposure device, a developing device, a transfer device, a fixing device, and the like. The image forming section 32 electrophotographically forms an image on a recording medium (sheet) that is conveyed from the paper feeding device 38 or the like and ejects, onto the paper output tray 40, the sheet on which the image has been formed. Note, however, that as print image data for forming an image on a sheet, image data read by the image reading section 30, image data transmitted from an external computer, or the like is used. Further, the recording medium is not limited to a sheet made from paper but may be a sheet other than paper such as an OHP film.

The paper output tray 40 is provided between the image reading section 30 and the image forming section 32. The paper output tray 40 has its bottom surface demarcated by the image forming section 32. Further, the paper output tray 40 has its top surface demarcated by the image reading section 30. Furthermore, the paper output tray 40 has its left side surface (left side surface as seen from the front side) defined by a right side surface of a coupling housing 42. That is, the paper output tray 40 has its front surface side, back surface side, and left side surface side open. The bottom surface of the paper output tray 40 has a slope that descends toward the coupling housing 42.

Further, the image reading section 30 has its front surface side provided with an operation panel 26. The operation panel 26 includes a display 22 and a plurality of operation buttons 26a. The display 22 is equipped with a touch panel 20.

The display 22 equipped with the touch panel 20 displays software keys, messages, and the like for accepting various settings, printing instructions, and the like from users. As an example, the display 22 displays various operation screens such as a home screen that is a screen for selecting a desired job from among various jobs that the image forming apparatus 10 is able to execute. Note, however, that in the first embodiment, the term "job" means copying (including scanning of a document), printing, transmission of a fax, and the like.

The operation buttons 26a are hardware keys and include, for example, a home key, a power-saving key, a main power supply key, and similar keys. The home key is a key for causing the display 22 to display the home screen. The power-saving key is a key for switching between a power-saving state (power-saving mode) in which power consumption is limited and a normal state (normal mode) in which power consumption is not limited. Note, however, that the operation buttons 26a may be software keys. In this case, the operation buttons 26a are displayed on the display 22 equipped with the touch panel 20.

The term "software key" here means, for example, a kay (icon) software-reproduced on a display surface of the display 22 equipped with the touch panel 20. On the other hand, the term "hardware key" manes a key (button) provided as a physical device. Further, an operation input on the operation panel 26 means an operation input to any part of the operation panel 26 such as an operation input on a software key (e.g. an touch input to the touch panel 20) and an operation input on a hardware key (e.g. a button operation of an operation button 26a).

Further, the operation panel 26 has its center front surface provided with a human detection sensor 50 for detecting a person who is present forward of or near the apparatus body 36 and a camera 52 serving as a photographing unit that takes a facial image of a person who is present forward of or near the apparatus body 36.

Figure 2:
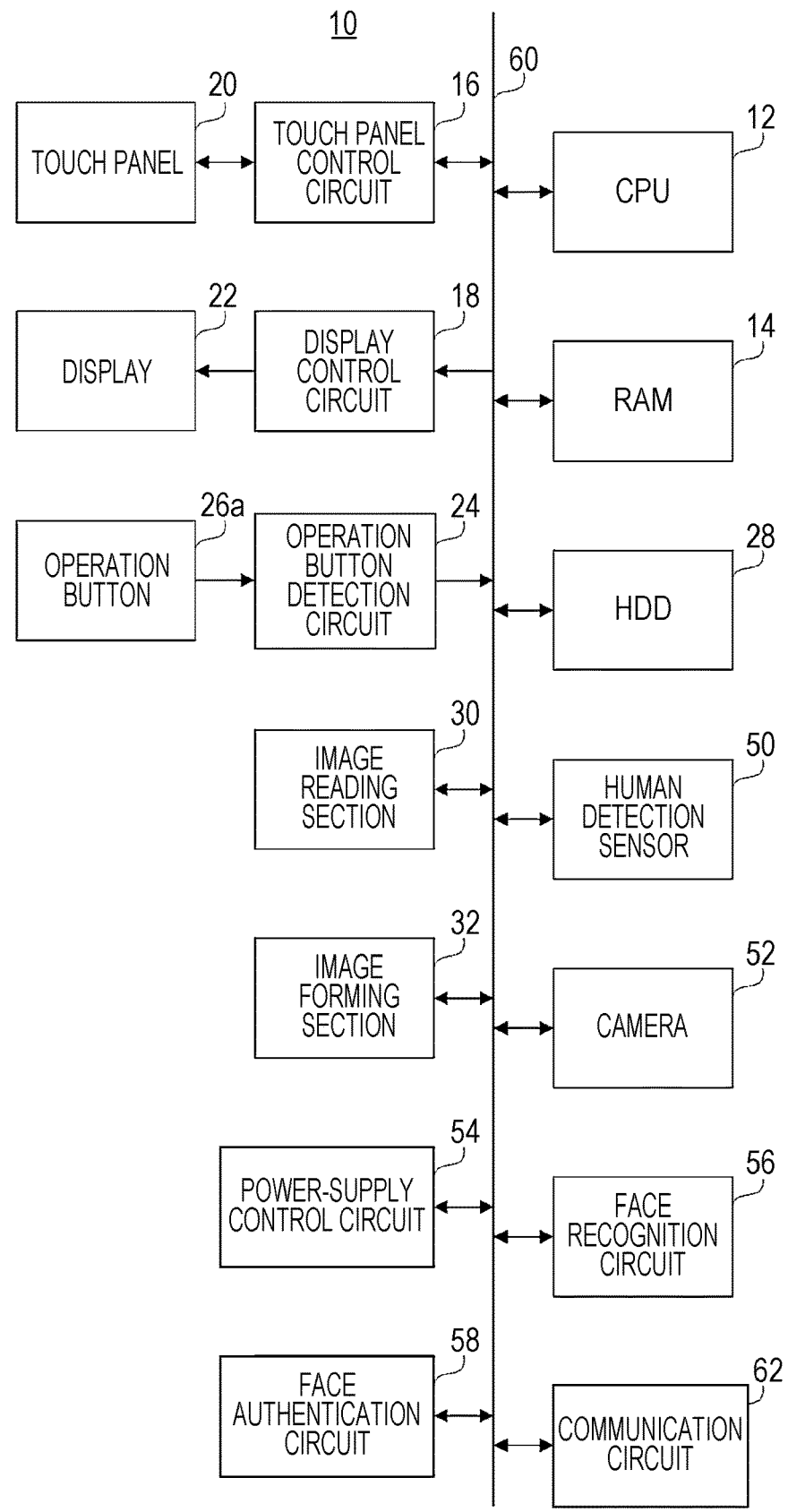
FIG. 2 is a block diagram showing an electrical configuration of the image forming apparatus shown in FIG. 1.

FIG. 2 is a block diagram showing an electrical configuration of the image forming apparatus 10 shown in FIG. 1. As shown in FIG. 2, the image forming apparatus 10 includes a CPU 12. Connected to the CPU 12 via a bus 60 are a RAM 14, a touch panel control circuit 16, a display control circuit 18, an operation button detection circuit 24, an HDD 28, the image reading section 30, the image forming section 32, the human detection sensor 50, the camera 52, a power-supply control circuit 54, a face recognition circuit 56, a face authentication circuit 58, and a communication circuit 62. Further, the touch panel 20, the display 22, and the operation buttons 26a are connected to the touch panel control circuit 16, the display control circuit 18, and the operation button detection circuit 24, respectively.

The CPU 12 exercises overall control of the image forming apparatus 10. The RAM 14 is used as a work region and a buffer region of the CPU 12.

The HDD 28 is a main memory device of the image forming apparatus 10 and has stored as appropriate therein a control program, data, and the like for the CPU 12 to control the actions of each component of the image forming apparatus 10. Further, the HDD 28 has stored therein authentication information of a user registered (registered user). Authentication information of a user contains identification information and a comparative image. Identification information is information, such as a user ID or a name, for specifying (identifying) a registered user. A comparative image is a facial image (facial image for use in registration) that is used for face authentication. Furthermore, the HDD 28 has stored therein job data (registered job data) registered by a registered user. For example, in the case of a print job, the term "job data" means data containing image data or the like transmitted from an external PC or the like. Associated with registered job data is identification information (such as a user ID) for identifying a registered user who stored the registered job data in the HDD 28.

Note, however, that the HDD 28 may be replaced by or used together with another nonvolatile memory such as an SSD, a flash memory, or an EEPROM.

The touch panel control circuit 16 applies a necessary voltage to the touch panel 20, detects a touch operation (touch input) within a touch effective range of the touch panel 20, and outputs, to the CPU 12, touch coordinates indicating a position of the touch input.

The touch panel 20 used can be a general-purpose touch panel of any type such as a capacitive touch panel, an electromagnetic induction touch panel, a resistive touch panel, or an infrared touch panel. In the first embodiment, the touch panel 20 used is a capacitive touch panel, and the touch panel 20 is provided on the display surface of the display 22. Note, however, that a touch panel display obtained by integrally forming the touch panel 20 and the display 22 may be used.

The display control circuit 18 includes a GPU, a VRAM, and the like. Under the instruction of the CPU 12, the GPU generates display image data on the VRAM using image generation data 74b (see FIG. 8) and outputs the display image data thus generated to the display 22. The image generation data 74b is stored on the RAM 14. The display image data is used for displaying various screens on the display 22. A usable example of the display 22 is an LCD, an EL (electroluminescence) display, or the like.

The operation button detection circuit 24 outputs, to the CPU 12, operation signals or operation data corresponding to operation of the aforementioned operation buttons 26a.

The human detection sensor 50 is a sensor, e.g. a distance sensor, for detecting whether a person (user) is present in a range (which corresponds to the first range) A (see FIG. 3) that is within an area around the image forming apparatus 10. Usable examples of the distance sensor include an infrared sensor, an ultrasonic sensor, a laser distance sensor, and the like. This distance sensor outputs distance data to the CPU 12. The CPU 12 determines, according to whether a distance represented by distance data outputted from the human detection sensor 50 is not longer than a predetermined distance that defines the range A, whether a person (user) is present in front (forward) of the image forming apparatus 10. Accordingly, the range A can be said to be a range set for determining whether a person is present in front of the image forming apparatus 10.

The distance sensor may be replaced by a usable example of the human detection sensor 50 such as a pyroelectric sensor, a floor sensor (pressure sensor), or a digital camera (image sensor). In a case where the pyroelectric sensor is used, the pyroelectric sensor detects a change in temperature in the range A and the CPU 12 determines, according to an output from the pyroelectric sensor, whether a person is present in the range A. Further, in a case where the floor sensor is used, the floor sensor is provided in a range of a floor surface that corresponds to the range A of the image forming apparatus 10 and the CPU 12 determines, according to an output from the floor sensor, whether a person is present in the range A. In a case where the image sensor is used, a motion of an object within a predetermined detection range can be detected by a change (motion) in image.

Figure 3:
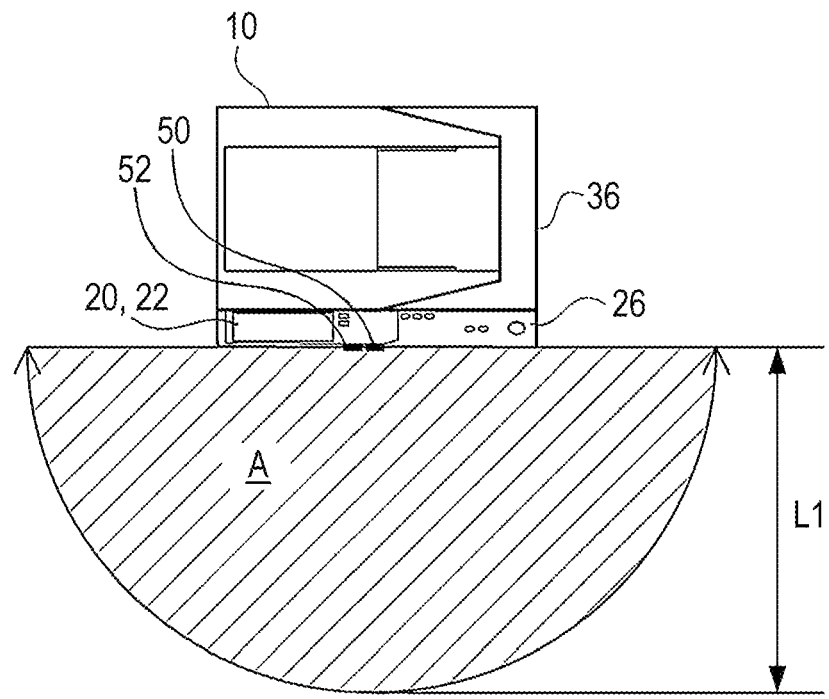
FIG. 3 is a plan view for explaining a range that is within an area around the image forming apparatus.
Figure 4:
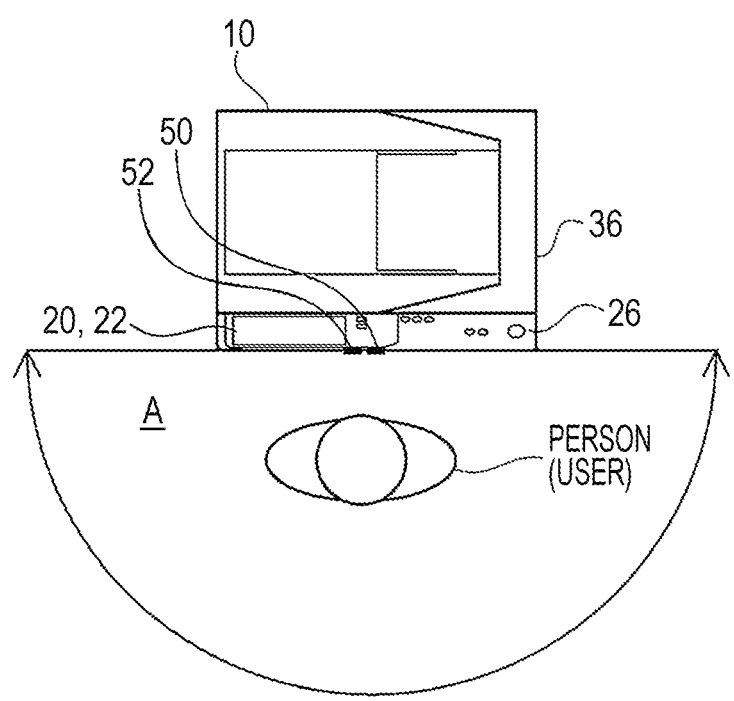
FIG. 4 is a plan view showing a case where a person is present in the range.

FIG. 3 is a plan view for explaining the range A, which is within the area around the image forming apparatus 10. FIG. 4 is a plan view showing a case where a person is present in the range A.

As shown in FIG. 3, the range A is a range in which a person who may use (operate) the image forming apparatus 10 is possibly present and, as an example, is defined by a semicircle whose radius is equal to a first distance L1. Note, however, that the first distance L1 is a horizontal distance from the center of the front surface of the apparatus body 36 of the image forming apparatus 10 and, in the first embodiment, is set to be not shorter than a length from the center of the front surface of the apparatus body 36 to either the right or left end of the apparatus body 36. That is, in the first embodiment, the range A is set as a range on the front surface side (forward) of the image forming apparatus 10 (apparatus body 36) within which a person who is present in such a position as to be able to operate the image forming apparatus 10 (e.g. such a position as to be able to reach the operation panel 26) is detectable.

Note, however, that the size and shape of the range A can vary as appropriate, provided that, as noted above, the range A is a range on the front surface side of the image forming apparatus 10 within which a person who is present in such a position as to be able to operate the image forming apparatus 10 is detectable. Further, although not described in detail, the number of human detection sensors 50 does not need to be limited to 1 but may be 2 or larger, provided that a person who is present in the range A thus set can be detected.

A detectable range of the human detection sensor 50 needs only include the range A and does not need to coincide with the range A. Further, in a case where there is a stationary obstacle in the range A, the obstacle may be excluded in advance from a detection result.

As shown in FIG. 4, in a case where a person is present in the range A, the human detection sensor 50 outputs, to the CPU 12, distance data corresponding to a distance that is shorter than the first distance L1. Upon receiving (acquiring) distance data representing a distance that is shorter than the first distance L1, the CPU 12 determines that a person is present in the range A. Further, in a case where no person is present in the range A, the human detection sensor 50 outputs, to the CPU 12, distance data corresponding to a distance that is longer than the first distance L1. Upon receiving distance data representing a distance that is longer than the first distance L1, the CPU 12 determines that no person is present in the range A.

Although not described in detail, the first embodiment is configured such that upon receiving distance data representing a distance that is equal to the first distance L1, the CPU 12 determines that a person is present in the range A. Note, however, that in this case, the CPU 12 may determine that no person is present in the range A.

The camera 52 takes an image of an area forward of the image forming apparatus 10 (apparatus body 36). Note, however, that a photographing range of the camera 52 includes at least the range A. For this reason, the camera 52 takes an image of at least the range A. The camera 52 includes an imaging element (image sensor), a lens, and a drive circuit, and takes an image by converting, into an electric signal, imaging light that is visible light taken in from the imaging element. An example of this imaging element is a solid-state imaging element such as a CCD image sensor or a CMOS (complementary metal-oxide semiconductor) image sensor. Further, the lens is an optical element for causing incident light to form an image on a light receiving section of the image sensor. The drive circuit drives the image sensor under the instruction of the CPU 12.

Figure 5:
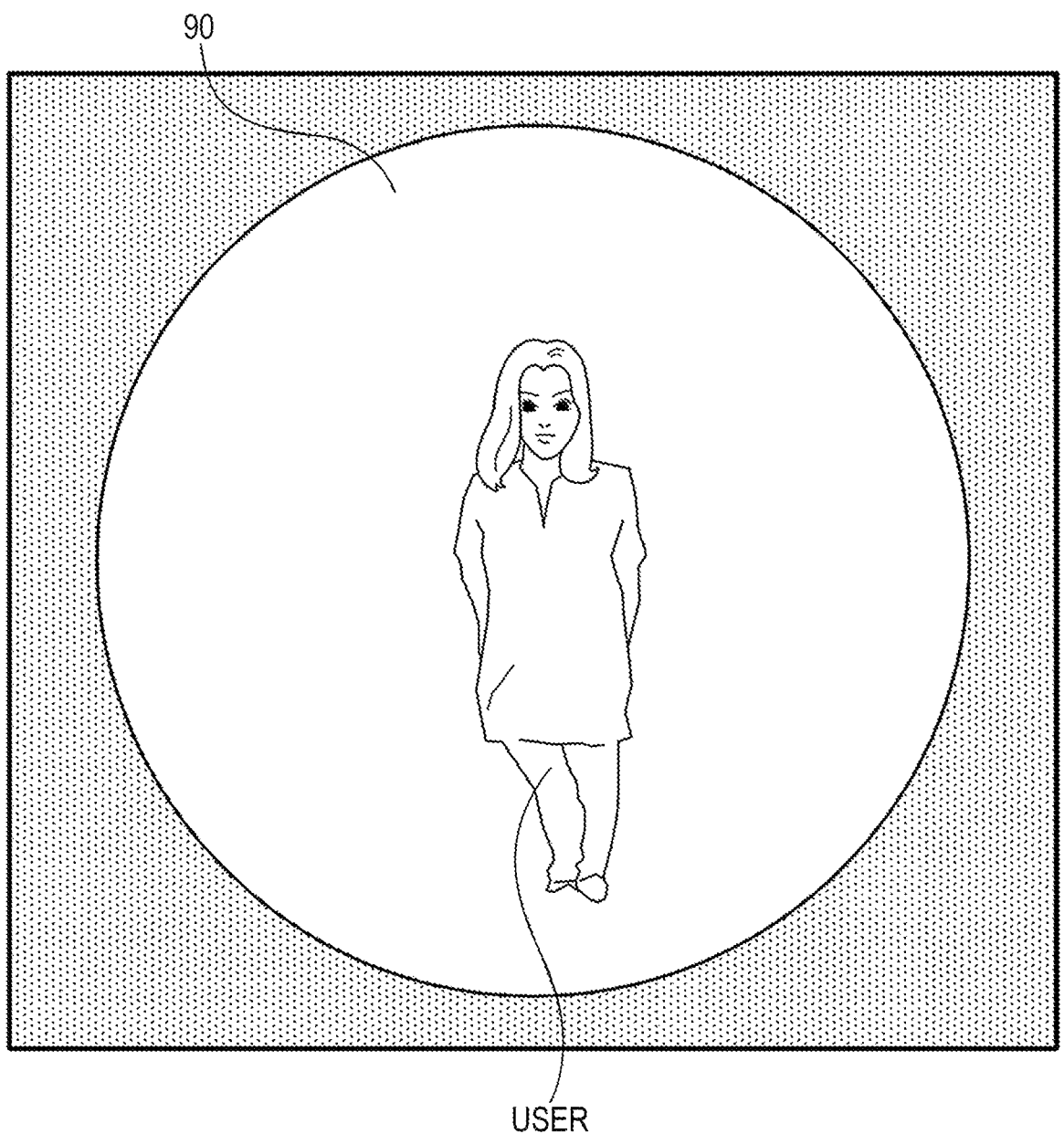
FIG. 5 is an explanatory diagram showing an example of a photographed image.
Figure 6:
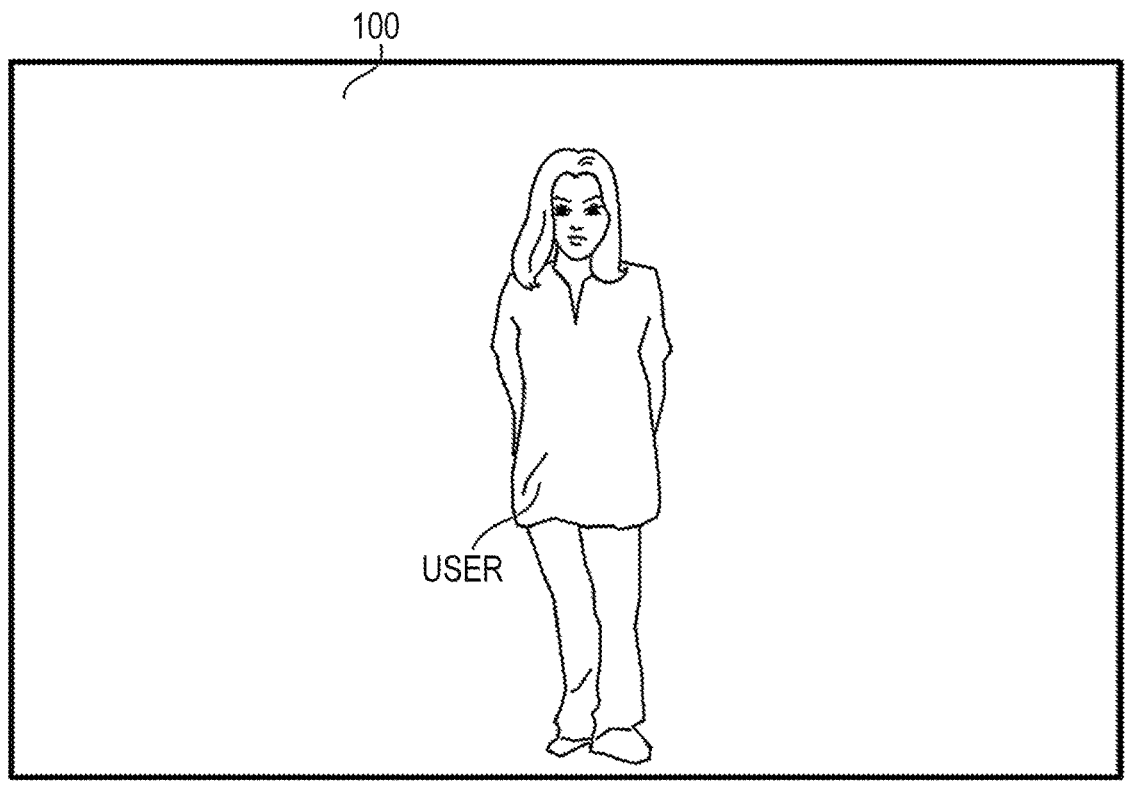
FIG. 6 is an explanatory diagram showing an example of a corrected image before face detection.

FIG. 5 is an explanatory diagram showing an example of a photographed image 90. FIG. 6 is an explanatory diagram showing an example of a corrected image 100 before face detection. The first embodiment uses a fish-eye lens as the lens. For this reason, a photographed image 90 taken by the camera 52 has a distortion as shown in FIG. 5. For this reason, a corrected image 100 such as that shown in FIG. 6 is generated by correcting the distortion of the photographed image 90. It should be noted that the fish-eye lens is used to make the camera 52 have a wider viewing angle.

The power-supply control circuit 54 is a control circuit for supplying power (electric power) to each component of the image forming apparatus 10 in accordance with instructions from the CPU 12. The power-supply control circuit 54 steps down and rectifies a commercial power supply to supply and stop a predetermined direct-current voltage appropriate to each component.

The CPU 12 controls an operating state of at least the image forming apparatus 10. In the first embodiment, the image forming apparatus 10 has a power-saving state (power-saving mode) in which an amount of power consumption is limited and a normal state (normal mode) in which the amount of power consumption is not limited. The CPU 12 controls the power-supply control circuit 54 according to the operating state to supply and stop electric power to each component of the image forming apparatus 10.

For example, in the normal mode, the CPU 12 controls the power-supply control circuit 54 to supply electric power to all components of the image forming apparatus 10. Note, however, that in the normal mode, no electric power is supplied to some components such as the camera 52.

On the other hand, in the power-saving mode, the CPU 12 controls the power-supply control circuit 54 to supply electric power to some components of the image forming apparatus 10.

Note, however, that the image forming apparatus 10 according to the first embodiment has four types of power-saving mode differing in amount of power consumption. Specifically, the image forming apparatus 10 has a first power-saving mode (first power-saving state) with the smallest amount of power consumption, a second power-saving mode (second power-saving state) with a larger amount of power consumption than the first power-saving mode, a third power-saving mode (third power-saving state) with a larger amount of power consumption than the second power-saving mode, and a fourth power-saving mode (fourth power-saving state) with a larger amount of power consumption than the third power-saving mode. Note, however, that the fourth power-saving mode is smaller in amount of power consumption than the normal mode.

More specifically, in the first power-saving mode, electric power is supplied to the CPU 12, a power-saving button included in the operation panel 26, the after-mentioned operation button detection circuit 24, and the human detection sensor 50. Note, however, that in the first power-saving mode, control is exercised so that power consumption of the image forming apparatus 10 becomes not higher than a first predetermined value (e.g. several percent of the maximum amount of power consumption) that is set in advance. Accordingly, the type and number of components to which electric power is supplied in the first power-saving mode are determined in consideration of the magnitude of the first predetermined value and the magnitude of power consumption of each component. Further, in a case where the image forming apparatus 10 is connected to a network, electric power is also supplied to the communication circuit 62, which serves to connect to the network, in the first power-saving mode.

In the second power-saving mode, electric power is also supplied to some components to which no electric power is supplied in the first power-saving mode. For example, in the second power-saving mode, electric power is also supplied to the camera 52 and the after-mentioned face recognition circuit 56 in addition to the components to which electric power is supplied in the first power-saving mode. Once electric power is supplied to the camera 52, the image sensor is driven and photographing is started.

In the third power-saving mode, electric power is also supplied to some components to which no electric power is supplied in the second power-saving mode. For example, in the third power-saving mode, electric power is also supplied to the after-mentioned face authentication circuit 58 in addition to the components to which electric power is supplied in the second power-saving mode.

In the fourth power-saving mode, electric power is also supplied to some components to which no electric power is supplied in the third power-saving mode. For example, in the fourth power-saving mode, electric power is also supplied to the HDD 28 in addition to the components to which electric power is supplied in the third power-saving mode.

The face recognition circuit 56 is a circuit, constituted by an ASCI (application specific integrated circuit), that, upon accepting an instruction to execute a face detection process, detects (recognizes) a facial image (which corresponds to a first image) from a corrected image 100 that is inputted and outputs facial image information about the facial image.

Figure 7:
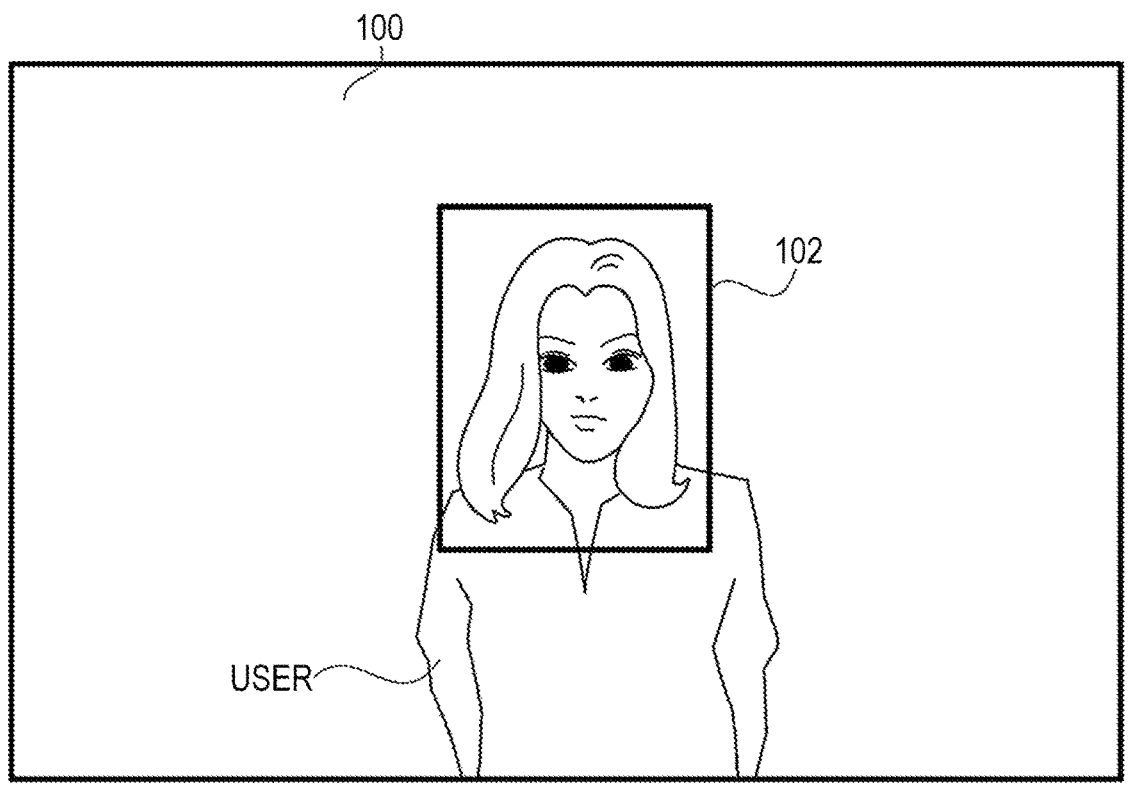
FIG. 7 is an explanatory diagram showing an example of a corrected image after face detection.

FIG. 7 is an explanatory diagram showing an example of a corrected image 100 after face detection. The face recognition circuit 56 receives a corrected image 100 obtained by correcting a photographed image taken by the camera 52 and detects a facial image 102 included in the corrected image 100. As shown in FIG. 7, the facial image 102 is an image included in a rectangular facial region included in the corrected image 100. Upon detecting the facial image 102, the face recognition circuit 56 inputs, to the CPU 12, facial image information indicating the position and range of the facial image 102 in the corrected image 100.

An example of a method for detecting a facial image is a method by which to extract features of an image in units of regions of a predetermined size and detect (identify) a facial region on the basis of an identifier of a facial image using Haar-Like features. The facial region is detected in the shape of a rectangle, and a detection result is outputted in the form of the coordinates of the upper left edge of the rectangle in the image and the length and breadth of the rectangle (or the coordinate of the lower right edge of the rectangular). The image included in this facial region serves as a facial image. Although various methods such as the Viola-Jones method have been proposed as another method for detecting a facial image, the present disclosure may use any method without any particular limitation.

Further, in a case where an object that induces erroneous detection of a facial image (e.g. a poster or the like including the face of a person) is present in the photographing range of the camera 52, an image of the poster or the like may be excluded in advance from a facial image detection result. For example, in a case where a facial image is detected in the same position in a plurality of photographed images taken at different points in time, the facial image may be automatically excluded from a detection result or a user may manually set a region (range) that is excluded from a facial image detection result.

The face authentication circuit 58 is a circuit, constituted by an ASIC, that, upon accepting an instruction to execute a face authentication process, extracts a facial image 102 from a corrected image 100 according to facial image information that is inputted from the CPU 12 and executes face authentication (face authentication of a user who corresponds to the facial image) using the facial image 102 thus extracted.

For a description of a specific method for face authentication processing using a facial image, refer to Japanese Unexamined Patent Application Publication No. 2004-265267 filed by the applicant of the present disclosure. A brief description of the method is given here. First, feature points (coordinates of particular parts on the face such as the eyes, the nose, and the mouth) are extracted from a facial image 102, and features at each separate feature point are calculated. Next, the features of the facial image 102 are compared with the features of a plurality of comparative images (facial images for use in registration) stored in advance in the HDD 28, and the degree of coincidence of each of the plurality of comparative images with the facial image 102 is computed (set). As mentioned above, a comparative image is a facial image of a registered user (user permitted user authentication).

Then, whether the user is a registered user is determined according to whether the plurality of comparative images include a comparative image whose degree of coincidence with the facial image 102 takes on a predetermined threshold or larger. In this example, in a case where the degree of coincidence of a certain comparative image takes on the threshold or larger, it is determined that the user who corresponds to the facial image 102 and the registered user who corresponds to the comparative image are the same person. That is, it is determined that the user who corresponds to the facial image 102 is the registered user.

Having determined that the user who corresponds to the facial image 102 is the registered user, the face authentication circuit 58 inputs, to the CPU 12, a face authentication processing result indicating successful authentication. Alternatively, having determined that the user who corresponds to the facial image 102 is not the registered user, the face authentication circuit 58 inputs, to the CPU 12, a face authentication processing result indicating failed authentication. The CPU 12 determines, according to the output from the face authentication circuit 58, whether face authentication has succeeded.

The communication circuit 62 is a communication circuit for connecting to a network such as the Internet. The communication circuit 62 is a cable communication circuit or a radio communication circuit and, in accordance with instructions from the CPU 12, communicates with an external computer such as a server via a network.

It should be noted that the electrical configuration of the image forming apparatus 10 shown in FIG. 2 is a mere example and is not intended to imply any limitation.

The following describes an example of operation of the image forming apparatus 10 according to the first embodiment. First, the image forming apparatus 10 according to the first embodiment is brought out of the normal mode into the first power-saving mode in a case where, in the normal mode, the image forming apparatus 10 has not been operated for a predetermined successive period of time or longer or the power-saving button has been pressed in the normal mode.

The image forming apparatus 10 is brought out of the first power-saving mode into the second power-saving mode when, in the first power-saving mode, a person has entered the range A from outside the range A or it has been determined that a person is present in the range A. As mentioned above, once the second power-saving mode is set, electric power is also supplied to the camera 52 and the after-mentioned face recognition circuit 56.

Once the second power-saving mode is set and electric power is supplied to the camera 52, photographing is started. Once photographing is started, the camera 52 outputs a photographed image 90 obtained by photographing a photographing range within an area around the image forming apparatus 10. The CPU 12 generates a corrected image 100 obtained by correcting a distortion of the photographed image 90 and inputs, to the face recognition circuit 56, the corrected image 100 and an instruction to execute a face detection process.

The face recognition circuit 56 detects a facial image 102 of a user from the corrected image 100 thus inputted, generates facial image information corresponding to the facial image 102, and outputs the facial image information to the CPU 12. Note, however, that in a case where no facial image of a user has been detected from the corrected image 100 (i.e. in a case where no facial image has been recognized), no facial image information is generated or outputted. In a case where facial image information has been outputted from the face recognition circuit 56, the CPU 12 determines that a facial image of a user has been detected from the corrected image 100. On the other hand, in a case where no face image information has been outputted from the face recognition circuit 56 for a predetermined successive period of time (e.g. 30 to 60 seconds) or longer since electric power was supplied to the camera 52 (or since the corrected image 100 was inputted to the face recognition circuit 56), the CPU 12 determines that no facial image of a user has been detected from the corrected image 100.

The image forming apparatus 10 is brought out of the second power-saving mode into the third power-saving mode when, in the second power-saving mode, a facial image of a user has been detected from the corrected image 100. As mentioned above, once the third power-saving mode is set, electric power is also supplied to the face authentication circuit 58.

Note, however, that the image forming apparatus 10 is brought out of the second power-saving mode into the first power-saving mode in a case where, in the second power-saving mode, no facial image of a user has been detected from the corrected image 100 and it has been determined that no person has been present in the range A for a predetermined successive period of time or longer since electric power was supplied to the camera 52 (i.e. since the image forming apparatus 10 was brought into the second power-saving mode).

Once the third power-saving mode is set and electric power is supplied to the face authentication circuit 58, the facial image 102 generated by the face recognition circuit 56 is inputted to the face authentication circuit 58. The face authentication circuit 58 executes face authentication using the facial image 102 thus inputted. As noted above, the camera 52, the face recognition circuit 56, the face authentication circuit 58, and the CPU 12 each function as a part of a determination unit (which corresponds to the second determination unit) that determines whether a user who is present in the area around the image forming apparatus 10 is a registered user.

The image forming apparatus 10 is brought out of the third power-saving mode into the fourth power-saving mode when, in the third power-saving mode, face authentication has succeeded or it has been determined that the user who corresponds to the facial image 102 is a registered user. As mentioned above, once the fourth power-saving mode is set, electric power is also supplied to the HDD 28. Once electric power is supplied to the HDD 28, the HDD 28 becomes accessible to CPU 12. Then, the CPU 12 determines whether the HDD 28 has stored therein registered job data registered by the registered user thus face-authenticated. In this example, the CPU 12 determines whether the HDD 28 has stored therein registered job data associated with the identification information of the registered user thus face-authenticated.

The image forming apparatus 10 is brought out of the fourth power-saving mode into the normal mode when, in the fourth power-saving mode, it has been determined that the HDD 28 has registered job data stored therein. As mentioned above, once the normal mode is set, electric power is supplied to almost all components of the image forming apparatus 10, so that the image forming apparatus 10 becomes available.

Note, however, that the image forming apparatus 10 is brought out of the third power-saving mode into the normal mode in a case where, in the third power-saving mode, face authentication has failed but a predetermined start operation has been carried out. Further, the image forming apparatus 10 is brought out of the fourth power-saving mode into the normal mode in a case where, in the fourth power-saving mode, it has been determined that the HDD 28 has no registered job data stored therein but a predetermined start operation has been carried out. The term "start operation" here means a user operation such as an operation input to the operation panel 26, an operation of opening and closing the document holding cover 30a, an operation of placing a document on the manual paper feeding section 34, and an operation of replenishing the paper feeding device 38 with a sheet.

Meanwhile, the first power-saving mode is set in a case where face authentication has failed, where it has been determined that the HDD 28 has no registered job data stored therein, and where no start operation has been carried out for a predetermined successive period of time or longer since the second power-saving mode was set (or since the third power-saving mode was set).

Further, in a case where another user comes in the photographing range of the camera 52 to replace the current user or in a case where more users come to be present in the photographing range of the camera 52, face recognition or face authentication is executed on a user having newly entered the photographing range, and in a case where the user having newly entered the photographing range is a registered user, it is determined whether the HDD 28 has stored therein registered job data associated with the identification information of the user.

Such operation of the image forming apparatus 10 is achieved by the CPU 12 executing a control program stored on the RAM 14. Specific processes will be described later with reference to flow charts.

Figure 8:
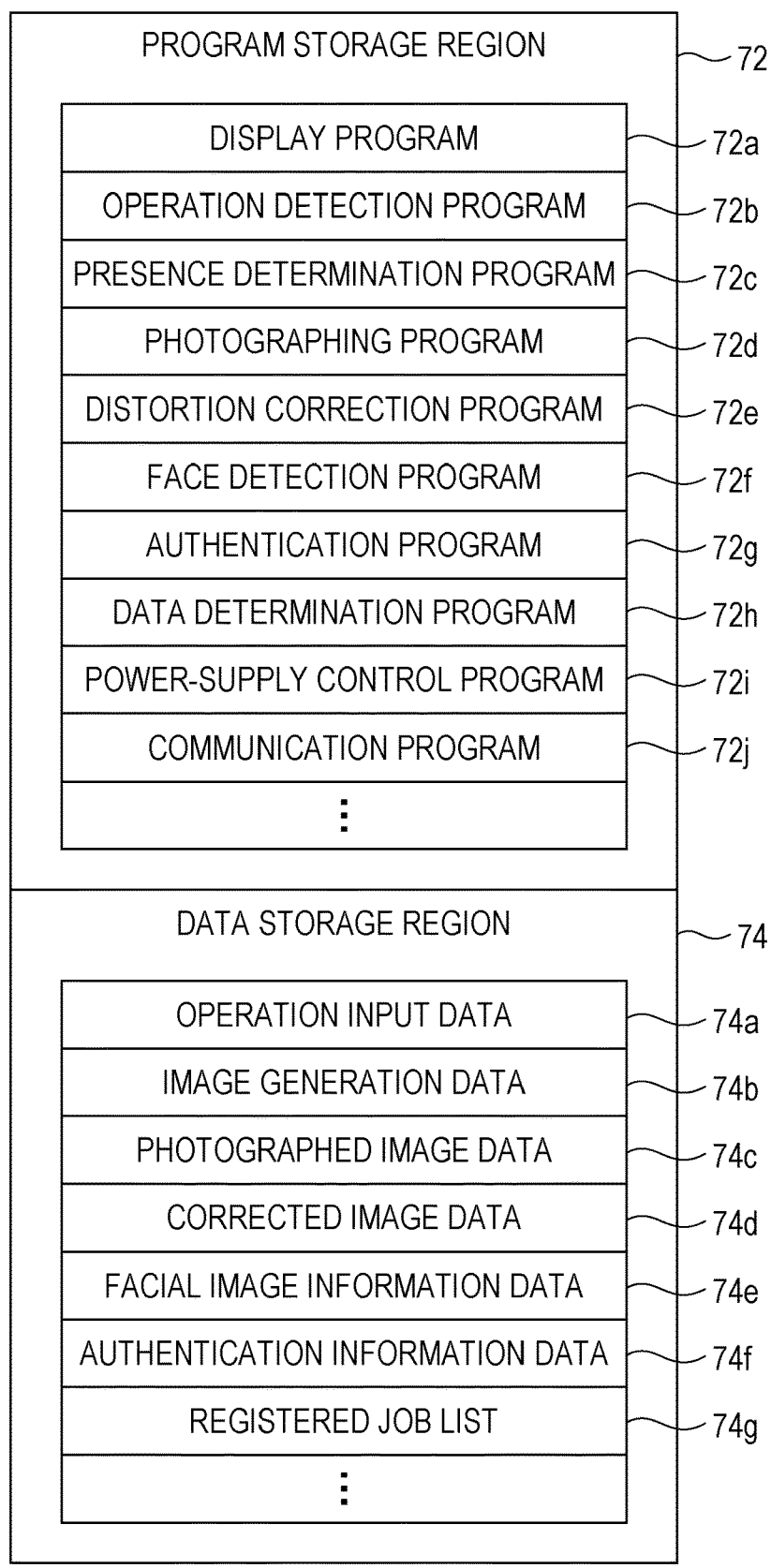
FIG. 8 is an explanatory diagram showing an example of a memory map of a RAM shown in FIG. 2.

FIG. 8 is an explanatory diagram showing an example of a RAM memory map 70 of the RAM 14 shown in FIG. 2. As shown in FIG. 8, the RAM 14 includes a program storage region 72 and a data storage region 74. As mentioned above, the program storage region 72 of the RAM 14 has a control program stored therein. The control program includes a display program 72a, an operation detection program 72b, a presence determination program 72c, a photographing program 72d, a distortion correction program 72e, a face detection program 72f, an authentication program 72g, a data determination program 72h, a power-supply control program 72i, and a communication program 72j.

The display program 72a is a program for displaying various screens such as the home screen on the display 22 using the after-mentioned image generation data 74b.

The operation detection program 72b is a program for detecting an operation performed on any section of the image forming apparatus 10. For example, the operation detection program 72b is a program for, by acquiring touch coordinate data outputted from the touch panel 20, detecting an operation performed on a software key included in various screens that are displayed on the display 22. Further, the operation detection program 72b is also a program for detecting an operation input from an operation button 26a.

The presence determination program 72c is a program for acquiring distance data that is outputted by the human detection sensor 50 and determining, according to whether a distance indicated by the distance data is not longer than a predetermined distance (in the first embodiment, the first distance L1), whether a person is present in the range A.

The photographing program 72d is a program for taking (acquiring) a photographed image 90 by controlling the camera 52. Note, however, that the CPU 12 stops the image sensor of the camera 52 in a case where the first power-saving mode has been set and drives the image sensor of the camera in a case where the second power-saving mode has been set.

The distortion correction program 72e is a program for generating a corrected image 100 by correcting a distortion of a photographed image 90 outputted from the camera 52.

The face detection program 72f is a program for inputting, to the face recognition circuit 56, a corrected image 100 and an instruction to execute a face detection process and generating facial image information data 74e according to facial image information outputted from the face recognition circuit 56.

The authentication program 72g is a program for inputting, to the face authentication circuit 58, facial image information corresponding to facial image information data 74e and an instruction to execute a face authentication process and acquiring face authentication processing result data outputted from the face authentication circuit 58. Further, the authentication program 72g is also a program for determining, according to the face authentication processing result data outputted from the face authentication circuit 58, whether face authentication has succeeded.

The data determination program 72h is a program for, in a case where it has been determined that face authentication has succeeded, determining, with reference to the after-mentioned registered job list 74g, whether the HDD 28 has stored therein registered job data registered by the registered user thus face-authenticated.

The power-supply control program 72i is a program for switching between the first power-saving mode and the second power-saving mode according to a detection result obtained by executing the presence determination program 72c as to whether a person is present in the range A. Further, the power-supply control program 72i is also a program for switching from the second power-saving mode to the third power-saving mode or the first power-saving mode according to whether facial image information has been outputted the face recognition circuit 56. Furthermore, the power-supply control program 72i is also a program for switching from the third power-saving mode to the fourth power-saving mode according to whether face authentication has succeeded. Furthermore, the power-supply control program 72i is also a program for switching from the fourth power-saving mode to the normal mode according to whether the HDD 28 has registered job data stored therein. Further, the power-supply control program 72i is also a program for switching from the third power-saving mode or the fourth power-saving mode to the normal mode or the first power-saving mode according to whether a start operation has been carried out. Furthermore, the power-supply control program 72i is also a program for switching from the normal mode to the first power-saving mode in a case where, in the normal mode, the image forming apparatus 10 has not been operated for a predetermined successive period of time or longer or the power-saving button has been pressed in the normal mode.

The communication program 72j is a program for communicating with an external computer or the like via a network.

Although not illustrated, the program storage region 72 has stored therein an image reading program, an image forming program, and similar programs. The image reading program is a program for reading an image of a document and outputting an image signal (image data) corresponding to the image thus read. The image forming program is a program for controlling the image forming section 32 to print a multicolor or monochrome image on a sheet. Further, the program storage region 72 has stored therein a program for selecting and executing various functions of the image forming apparatus 10 and similar programs.

The data storage region 74 of the RAM 14 has stored therein operation input data 74a, image generation data 74b, photographed image data 74c, corrected image data 74d, facial image information data 74e, authentication information data 74f, a registered job list 74g, and similar data.

The operation input data 74a is touch coordinate data and/or operation data detected (acquired), for example, in accordance with the operation detection program 72b. The touch coordinate data and/or operation data thus detected is/are stored in chronological order.

The image generation data 74b is data such as polygon data or texture data for generating display image data corresponding to various screens, such as the home screen, that are displayed on the display 22. Further, the image generation data 74b also contains, for example, image data representing the software keys and similar data.

The photographed image data 74c is image data on a photographed image 90 taken by the camera 52 in accordance with the photographing program 72d.

The corrected image data 74d is image data on a corrected image 100 generated by performing a distortion correction process on a photographed image 90 in accordance with the distortion correction program 72e.

The facial image information data 74e is data representing facial image information about a facial image generated in accordance with the face detection program 72f. For example, the facial image information data 74e is an aggregate of coordinate data indicating a region (position) of a facial image 102 in a corrected image 100. Note, however, that in a case where the facial image has a rectangular shape, the facial image information data 74e may be an aggregate of coordinate data indicating a frame border defining the region of the facial image 102 or may be coordinate data representing two points defining the region of the facial image 102.

The authentication information data 74f is data on authentication information on each of a plurality of registered users and contains identification information data on identification information for identifying the registered users, comparative image data on comparative images, features data on features of the comparative images, and similar data. Note, however, that the comparative image data and the features data are associated with the identification information data.

The registered job list 74g is a list of registered job data stored in the HDD 28. Associated with the registered job list 74g is identification information data representing registered users who stored the registered job data in the HDD 28. The registered job list 74g is read out from the HDD 28 as needed and stored on the RAM 14.

Although not illustrated, the data storage region 74 has stored therein other data that is necessary for the execution of the control program and is provided with a timer (counter) and a register that are necessary for the execution of the control program.

Figure 9:
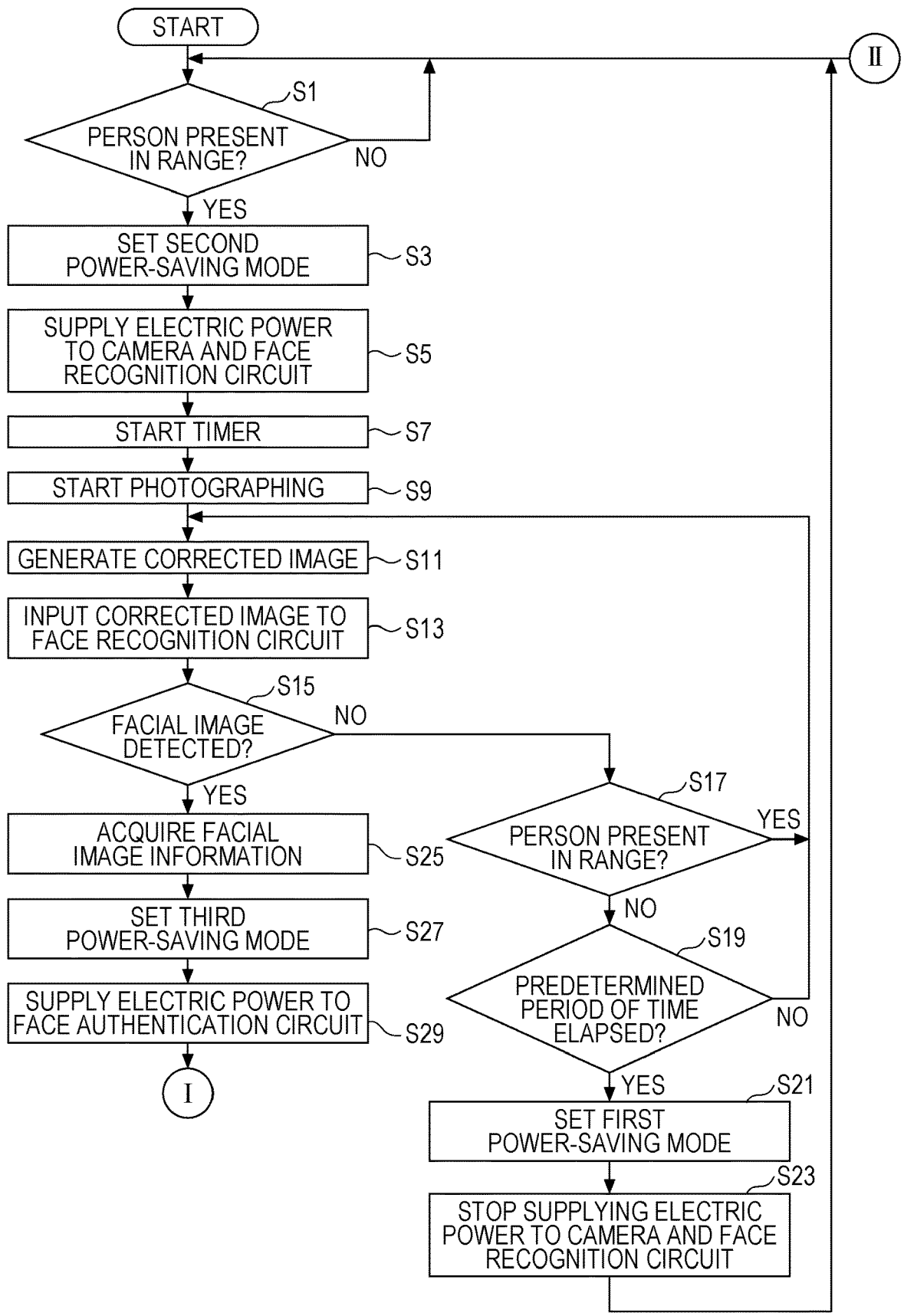
FIG. 9 is a flow chart showing a part of an example of a power-supply control process that is performed by a CPU shown in FIG. 2.
Figure 10:
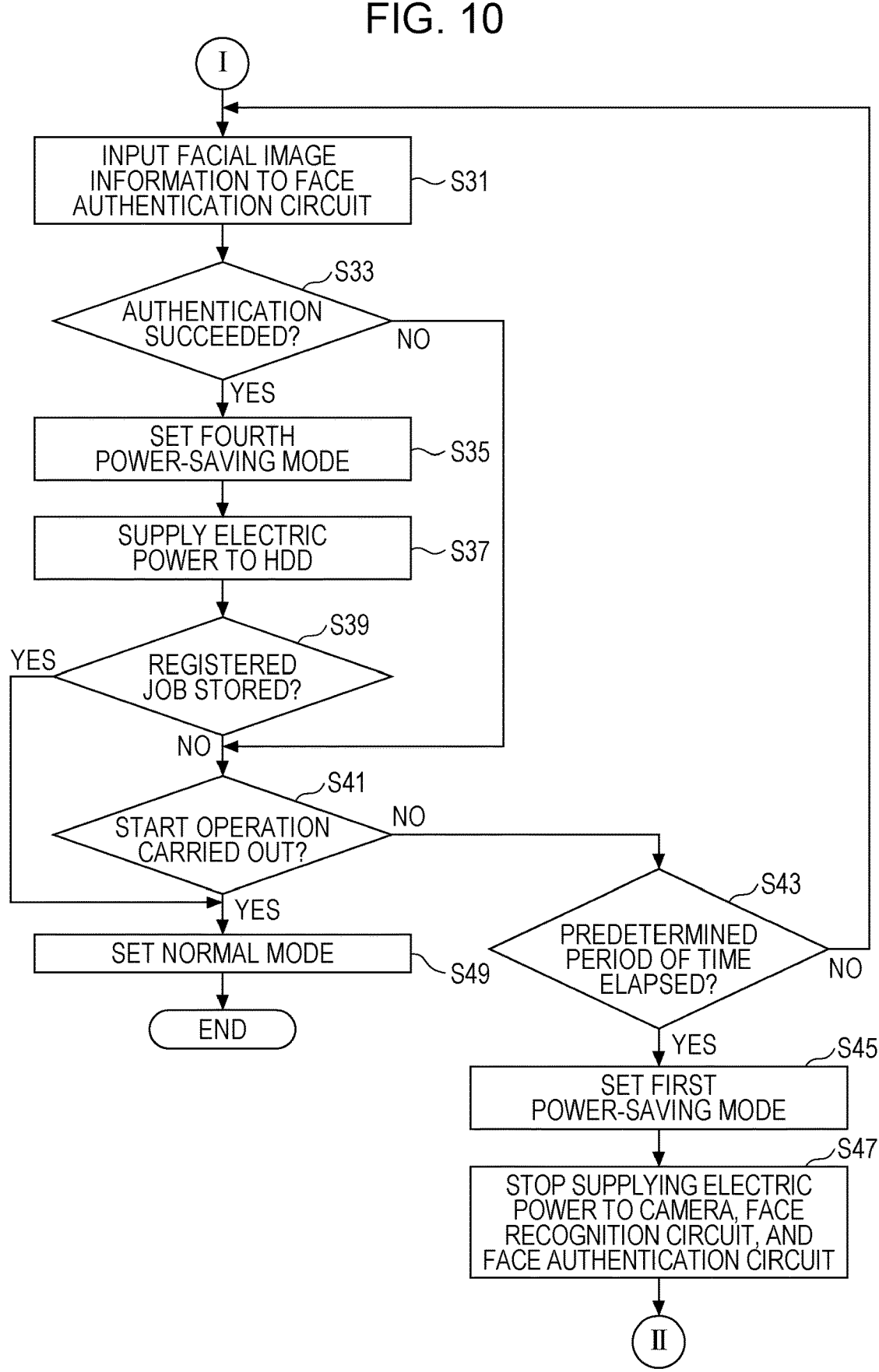
FIG. 10 is a flow chart showing a part of the example of the power-supply control process and following FIG. 9.

FIG. 9 is a flow chart showing a part of an example of a power-supply control process that is performed by the CPU 12 shown in FIG. 2. FIG. 10 is a flow chart showing a part of the example of the power-supply control process and following FIG. 9. This power-supply control process is executed in a case where the image forming apparatus 10 is in the first power-saving mode.

As shown in FIG. 9, at the start of the power-supply control process, the CPU 12 executes step S1, in which to determine whether a person is present in the range A. In this example, the CPU 12 acquires distance data detected by the human detection sensor 50 and, in a case where, as mentioned above, distance data corresponding to a distance that is shorter than the first distance L1 has been detected (acquired) for a predetermined successive period of time (e.g. several seconds) or longer, determines that a person is present in the range A. On the other hand, in a case where distance data corresponding to a distance that is longer than the first distance L1 has been detected, the CPU 12 determines, in a case where distance data corresponding to a distance that is shorter than the first distance L1 has been detected but not for the predetermined successive period of time or longer, that no person is present in the range A.

If "NO" in step S1, i.e. in a case where the CPU 12 has determined that no person is present in the range A, the CPU 12 returns directly to the same step S1. On the other hand, if "YES" in step S1, i.e. in a case where the CPU 12 has determined that a person is present in the range A, the CPU 12 executes step S3, in which to set the second power-saving mode, step S5, in which to supply electric power to the camera 52 and the face recognition circuit 56, step S7, which to start the timer, and step S9, in which to start photographing with the camera 52. Note, however, that the timer is a timer for counting a length of time that has continued since the second power-saving mode was set and, although not illustrated, is provided in an inner part (CPU 12 or RAM 14) of the image forming apparatus 10.

Then, the CPU 12 executes step S11, in which to generate a corrected image 100 from a photographed image 90 taken by the camera 52, step S13, in which to input the corrected image 100 to the face recognition circuit 56, and step S15, in which to determine, according to an output from the face recognition circuit 56, whether a facial image 102 has been detected from the corrected image 100.

If "NO" in step S15, i.e. in a case where the CPU 12 has determined that no facial image of a user has been detected from the corrected image 100, the CPU 12 executes step S17, in which to determine whether a person is present in the range A. If "YES" in step S17, i.e. in a case where the CPU 12 has determined that a person is present in the range A, the CPU 12 returns to step S11. If "NO" in step S17, i.e. in a case where the CPU 12 has determined that no person is present in the range A, the CPU 12 executes step S19, in which to determine whether a predetermined period of time has elapsed since the second power-saving mode was set. In this example, the CPU 12 determines whether a count value of the timer has exceeded a predetermined value.

If "NO" in step S19, i.e. in a case where the CPU 12 has determined that the predetermined period of time has not elapsed since the second power-saving mode was set, the CPU 12 returns to step S11. On the other hand, if "YES" in step S19, i.e. in a case where the predetermined period of time has elapsed since the second power-saving mode was set, the CPU 12 executes step S21, in which to set the first power-saving mode, and step S23, in which to stop supplying electric power to the camera 52 and the face recognition circuit 56, and returns to step S1.

Further, if "YES" in step S15, i.e. in a case where the CPU 12 has determined that a facial image of a user has been detected from the corrected image 100, the CPU 12 executes step S25, in which to acquire facial image information that is outputted from the face recognition circuit 56, step S27, in which to set the third power-saving mode, and step S29, in which to supply electric power to the face authentication circuit 58, and proceeds to step S31 shown in FIG. 10.

Then, the CPU 12 executes step S31, in which to input the facial image information to the face authentication circuit 58, and step S33, in which to determine, according to an output from the face authentication circuit 58, whether face authentication has succeeded.

If "NO" in step S33, i.e. in a case where the CPU 12 has determined that face authentication has failed, the CPU 12 proceeds to the after-mentioned step S41. On the other hand, if "YES" in step S33, i.e. in a case where the CPU 12 has determined that face authentication has succeeded, the CPU 12 executes step S35, in which to set the fourth power-saving mode, step S37, in which to supply electric power to the HDD 28, and step S39, in which to determine, with reference to the registered job list 74g, whether the HDD 28 has stored therein registered job data registered by the registered user thus face-authenticated.

If "YES" in step S39, i.e. in a case where the CPU 12 has determined that the HDD 28 has registered job data stored therein, the CPU 12 proceeds to the after-mentioned step S49. On the other hand, if "NO" in step S39, i.e. a case where the CPU 12 has determined that the HDD 28 has no registered job data stored therein, the CPU 12 executes step S41, in which to determine whether a start operation has been carried out.

If "NO" in step S41, i.e. in a case where the CPU 12 has determined that no start operation has been carried out, the CPU 12 executes step S43, in which to determine whether a predetermined period of time has elapsed since the second power-saving mode was set. If "NO" in step S43, the CPU 12 returns to step S31. On the other hand, if "YES" in step S43, the CPU 12 executes step S45, in which to set the first power-saving mode, and step S47, in which to stop supplying electric power to the camera 52, the face recognition circuit 56, and the face authentication circuit 58, and returns to step S1.

If "YES" in step S41, i.e. in a case where the CPU 12 has determined that a start operation has been carried out, the CPU 12 proceeds to step S49, in which to set the normal mode, and ends the power-supply control process. Although not described in detail, in a case where, after the normal mode has been set in step S49, the image forming apparatus 10 has not been operated for a predetermined successive period of time or longer or the power-saving button has been pressed in the normal mode, the first power-saving mode is set and the power-supply control process is started.

Since the first embodiment is configured such that the image forming apparatus 10 switches from the power-saving mode to the normal mode in a case where a person approaching the image forming apparatus 10 is a registered user and there is registered job data registered by the registered user, the first embodiment makes it possible to prevent the image forming apparatus 10 from being frequently switched to the normal mode in a case where the image forming apparatus 10 is not used. This makes it possible to achieve a reduction in power consumption and make an appropriate transition from the power-saving mode to the normal mode.

Further, since the first embodiment is configured such that the image forming apparatus 10 switches to the normal mode in a case where a start operation has been carried out, the first embodiment allows a user who has operated the image forming apparatus 10 to use the image forming apparatus 10 immediately.

Furthermore, since the first embodiment is configured such that the face recognition circuit 56 and the face authentication circuit 58 are constituted by ASICs, the first embodiment makes it possible to reduce the amount of electricity that is consumed by execution of a face recognition process and a face authentication process.

Furthermore, since the first embodiment has four types of power-saving mode differing in amount of power consumption and switches among the four types of power-saving mode according to outputs from the human detection sensor 50, the camera 52, the face recognition circuit 56, and the face authentication circuit 58 (i.e. switches between supply and stoppage of electric power to the human detection sensor 50, the camera 52, the face recognition circuit 56, the face authentication circuit 58, the HDD 28), the first embodiment makes it possible to appropriately achieve a reduction in power consumption.

Although the first embodiment uses the distance sensor as the human detection sensor 50, this is not intended to imply any limitation. For example, the camera 52 may be used as the human detection sensor 50. In this case, the presence or absence of a person can be detected from a photographed image taken by the camera 52. Note, however, that in this case, the image sensor of the camera 52 is always driven in a state where the image forming apparatus 10 has its main power supply turned on.

Further, although the first embodiment has been described by taking as an example a case where the lens of the camera 52 is a fish-eye lens, this not intended to imply any limitation. A usable example of the lens of the camera 52 is a wide-angle lens or a normal lens. In a case where the lens of the camera 52 is a normal lens, the process of correcting a distortion can be omitted.

Furthermore, although the first embodiment has been described by taking as an example a case where the number of cameras 52 is 1, this is not intended to imply any limitation. For example, two or more cameras may be provided, or movable cameras may be used to photograph different photographing ranges. In these cases, a corrected image 100 is generated by synthesizing and correcting a plurality of photographed images.

Furthermore, although the first embodiment is configured such that the face recognition circuit 56 and the face authentication circuit 58 are constituted by ASICs, the face recognition circuit 56 and the face authentication circuit 58 may be realized by software using the CPU 12.

Further, although the first embodiment is configured such that registered job data is stored in the HDD 28, this is not intended to imply any limitation. For example, the registered job data may be stored in an external storage device such a database that is accessible to the CPU 12. In this case, the registered job list 74g may be stored in the HDD 28 or may be stored in the external storage device in which the registered job data is stored. Note, however, that in a case where the registered job data or the registered job list 74g is stored in the external storage device, electric power is supplied to the communication circuit 62 when the fourth power-saving mode has been set, so that the external storage device becomes accessible to the CPU 12.

Second Embodiment

An image forming apparatus 10 of a second embodiment is identical to that of the first embodiment except that it is configured to, in a case where a job corresponding to registered job data is immediately executable, automatically execute the job. Therefore, only the contents which are different from those of the first embodiment are described, and a repeated description is omitted.

In the second embodiment, registered job data contains executability/inexecutability information as to whether a job included in the registered job data is immediately executable.

The image forming apparatus 10 according to the second embodiment is configured such that when it has been determined that the HDD 28 has stored therein registered job data registered by a registered user, the normal mode is set and it is determined whether a job corresponding to the registered job data is immediately executable. In this example, immediate executability is determined according to the executability/inexecutability information contained in the registered job data.

Note here that in a case where the job corresponding to the registered job data is immediately executable, the job is automatically executed when the normal mode has been set. For example, in a case where the job corresponding to the registered job data is a print (printing) job, the print job is executed using image data contained in the registered job data.

On the other hand, in a case where it has been determined that the job corresponding to the registered job data is not immediately executable, the job is executed when an user operation of executing the job is accepted after the normal mode has been set. In this case, when the normal mode has been set, the display 22 may display not a normal operation screen (such as the home screen) but a dedicated operation screen that lets a user choose whether to execute the job. For example, the dedicated operation screen may display an execution icon assigned a function of executing the job corresponding to the registered job data, and when the execution icon has been selected, the job may be executed. In this way, the job corresponding to the registered job data can be executed by a simple operation, as it is only necessary to select the execution icon. Further, a user's waiting time can be shortened, as operation time for executing the job can be shortened.

Although not illustrated, the control program stored on the RAM 14 includes an executability/inexecutability determination program for determining, according to the executability/inexecutability information, whether the job corresponding to the registered job data is immediately executable. Such operation of the image forming apparatus 10 is realized by the CPU 12 executing the control program including the executability/inexecutability determination program.

The following describes a power-supply control process according to the second embodiment with reference to a flow chart. Steps which are identical to those of the power-supply control process described in the first embodiment are given the same reference signs, and overlapping contents are not described or are briefly described.

Figure 11:
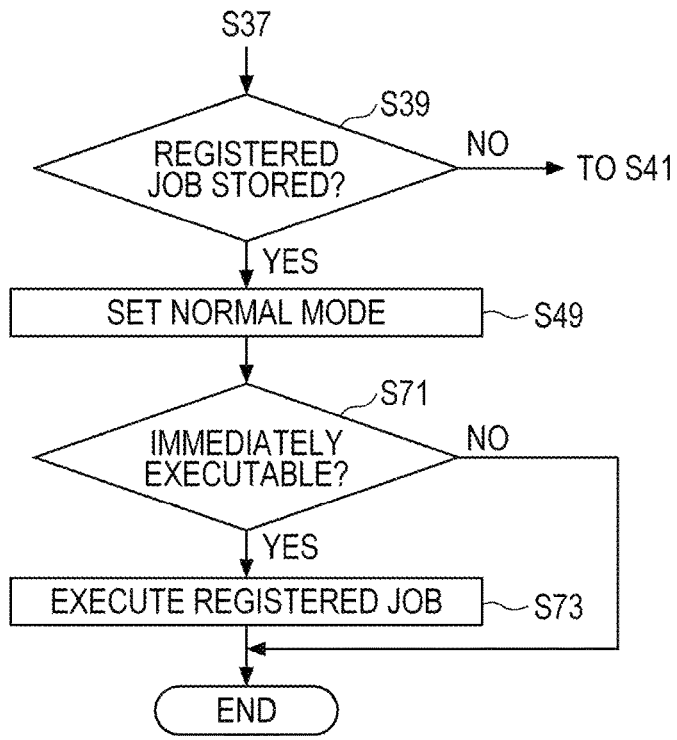
FIG. 11 is a flow chart showing an example of a power-supply control process according to a second embodiment.

FIG. 11 is a flow chart showing an example of the power-supply control process according to the second embodiment. As shown in FIG. 11, at the start of the power-supply control process, the CPU 12 executes step S49, in which to set the normal mode, and step S71, in which to determine whether a job corresponding to registered job data is immediately executable. If "YES" in step S71, i.e. in a case where the CPU 12 has determined that the job corresponding to the registered job data is immediately executable, the CPU 12 executes step S73, in which to automatically execute the job corresponding to the registered job data, and ends the power-supply control process. On the other hand, if "NO" in step S71, i.e. in a case where the CPU 12 has determined that the job corresponding to the registered job data is not immediately executable, the CPU 12 ends the power-supply control process without executing step S73.

The contents of the process until step S49 are not described, as they are identical to those of the first embodiment. Further, in a case where the HDD 28 has no registered job data stored therein when the normal mode has been set in step S49, the aforementioned steps S71 and S73 are omitted.

Since the second embodiment is configured to, in a case where a job corresponding to registered job data is immediately executable, automatically execute the job, the second embodiment makes it possible to shorten a user's waiting time.

Third Embodiment

An image forming apparatus 10 of a third embodiment is identical to that of the first embodiment except that it is configured such that in a case where there are a plurality of registered user candidates, the display 22 displays an authentication screen 120 for selecting a registered user. Therefore, only the contents which are different from those of the first embodiment are described, and a repeated description is omitted.

Figure 12:
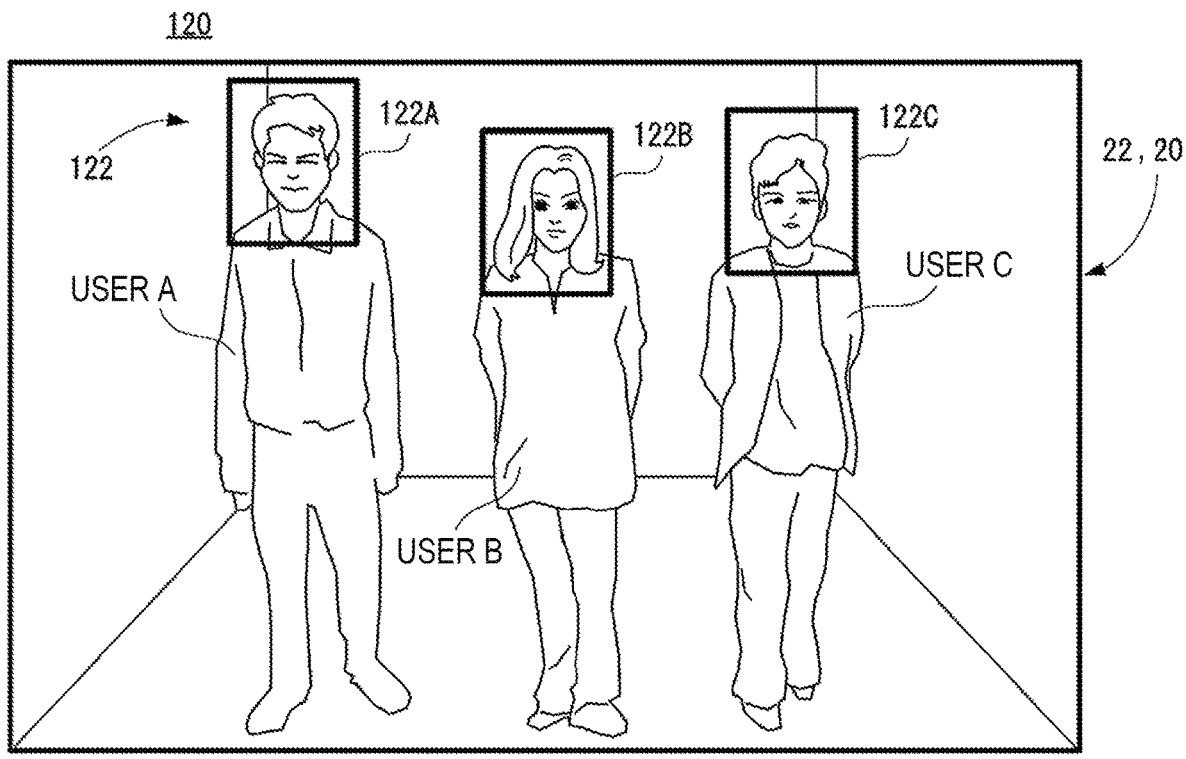
FIG. 12 is an explanatory diagram showing an example of an authentication screen according to a third embodiment.
Figure 13:
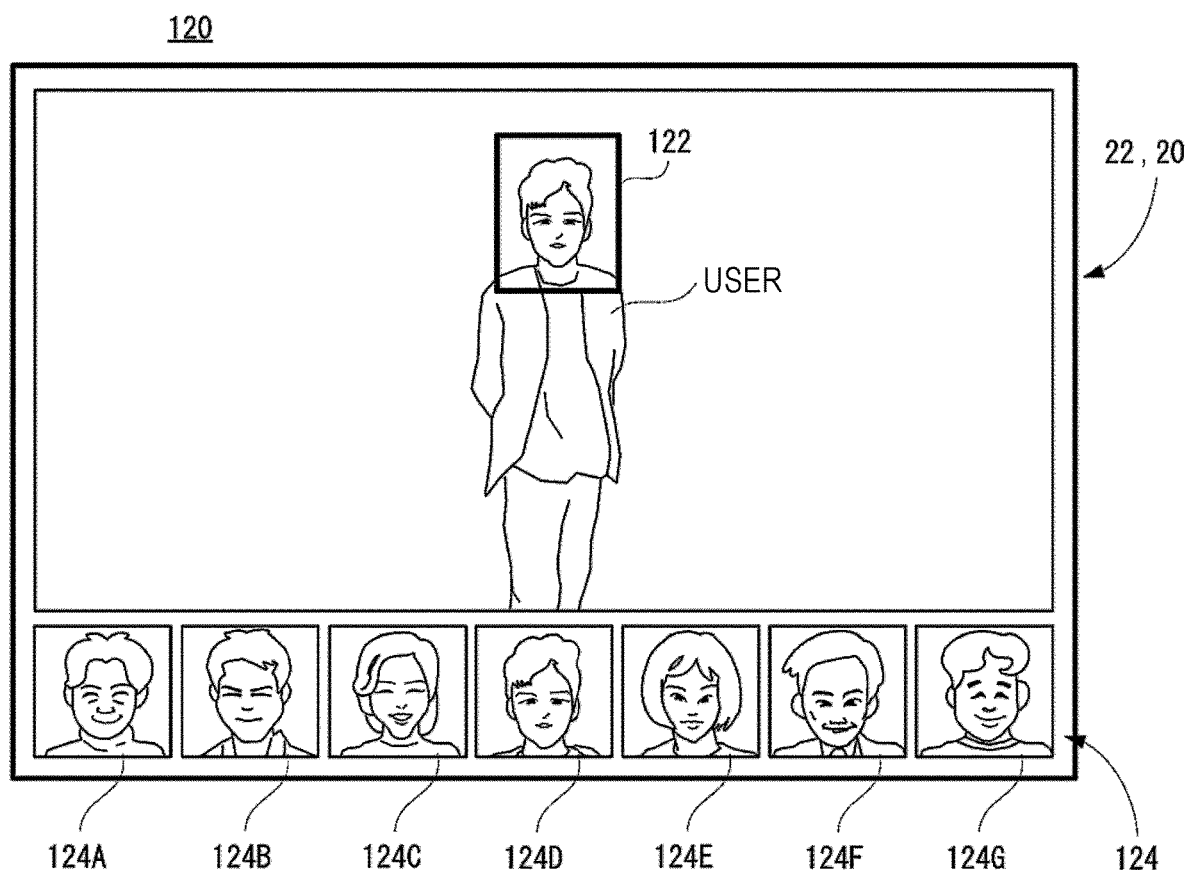
FIG. 13 is an explanatory diagram showing another example of the authentication screen according to the third embodiment.

FIG. 12 is an explanatory diagram showing an example of the authentication screen 120 according to the third embodiment. FIG. 13 is an explanatory diagram showing another example of the authentication screen 120 according to the third embodiment.

In the third embodiment, there may be a plurality of registered user candidates (authentication candidates). Cases where there are a plurality of authentication candidates include a case where a plurality of registered users have been authenticated as a result of face authentication and a case where there are a plurality of registered user candidates corresponding to a facial image.

In a case where there are a plurality of authentication candidates, the image forming apparatus 10 according to the third embodiment is brought into a fifth power-saving mode. Note, however, that the fifth power-saving mode is a mode that is larger in amount of power consumption than the fourth power-saving mode and smaller in amount of power consumption than the normal mode.

Specifically, in the fifth power-saving mode, electric power is also supplied to the operation panel 26 in addition to the components to which electric power is supplied in the fourth power-saving mode. That is, electric power is also supplied to the touch panel 20, the display 22, and the plurality of operation buttons 26*a*. Therefore, once the fifth power-saving mode is set, the display 22 can display an operation screen.

First, a case is described where a plurality of registered users have been authenticated as a result of face authentication. For example, in a case where three users (uses A to C) are included in the photographing range of the camera 52, a photographed image 90 and a corrected image 100 include images of the users A to C. Assume, however, that the users A to C are registered users. Accordingly, once a facial image of each of the users A to C is detected and a face authentication process is executed on each of the users A to C, face authentication of the users A to C succeeds. At this point in time, the image forming apparatus 10 is brought into the fourth power-saving mode, as the face authentication of the users A to C has succeeded. However, a determination as to whether to set the normal mode cannot be made, as it is impossible to specify which of the users A to C is a user (actual user) who actually uses the image forming apparatus 10.

To address this problem, as shown in FIG. 12, the display 22 displays the authentication screen 120 including images of the users A to C. For example, the authentication screen 120 displays a frame image 122A corresponding to a facial image of the user A, a frame image 122B corresponding to a facial image of the user B, and a frame image 122C corresponding to a facial image of the user C.

The frame images 122A to 122C function as software keys. Note, however, that the inside of the frame of each of the frame images 122A to 122C is set as a touch effective range. That is, the authentication screen 120 allows the user who actually uses the image forming apparatus 10 to select his/her own facial image (frame image 122).

Then, when any of the frame images 122A to 122C is touched (selected), the registered user who corresponds to the frame image 122 thus selected is specified as a registered user (actual user) who actually uses the image forming apparatus 10. Once the actual user is specified, it is determined whether the HDD 28 has stored therein registered job data registered by the actual user and the normal mode is set according to a result of the determination, as is the case with the first embodiment.

Next, a case is described where there are a plurality of registered user candidates (candidate users) corresponding to a facial image. For example, in a face authentication process, there may be a plurality of comparative images whose degrees of coincidence with the facial image take on the predetermined threshold or larger. In this case, a determination as to whether to set the normal mode cannot be made, as it is impossible to specify a registered user who corresponds to the facial image.

To address this problem, as shown in FIG. 13, the display 22 displays the authentication screen 120 including a plurality of images (identification information icons) 124 corresponding to plural pieces of identification information corresponding to the plurality of candidate users, respectively.

For example, the authentication screen 120 includes a frame image 122 corresponding to a facial image of a user and identification information icons 124A to 124G. For example, the identification information icons 124A to 124G include comparative images of the corresponding candidate users. The identification information icons 124A to 124G are arranged side by side in the right-left direction. For example, the identification information icon 124D with the highest priority of the identification information icons 124A to 124G is placed between the right and left halves. Note, however, that the arrangement of the plurality of identification information icons 124 on the authentication screen 120 does not need to be limited to any particular aspect and can vary as appropriate.

Then, when any of the identification information icons 124A to 124G is touched, the registered user who corresponds to the identification information icon 124 thus selected is specified as a registered user (actual user) who corresponds to the facial image of the user. Once the actual user is specified, it is determined whether the HDD 28 has stored therein registered job data registered by the actual user and the normal mode is set according to a result of the determination, as is the case with the first embodiment.

The case where there are a plurality of candidate users includes a case where, in a face authentication process, there is no comparative image whose degree of coincidence with the facial image takes on the predetermined threshold or larger. In this case, a registered user who corresponds to a comparative image whose degree of coincidence with the facial image is not larger than the predetermined threshold but is high is extracted as a candidate user.

Although not illustrated, the control program stored on the RAM 14 includes a specifying program for, in a case where a plurality of registered users have been authenticated as a result of face authentication, specifying an actual user from among the plurality of registered users by such a method as that mentioned above and for, in a case where there are a plurality of candidate users, specifying a registered user from among the plurality of candidate users by such a method as that mentioned above. Such operation of the image forming apparatus 10 is realized by the CPU 12 executing the control program including the specifying program.

The following describes a power-supply control process according to the third embodiment with reference to a flow chart. Steps which are identical to those of the power-supply control process described in the first embodiment are given the same reference signs, and overlapping contents are not described or are briefly described.

FIG. 14 is a flow chart showing an example of the power-supply control process according to the third embodiment. As shown in FIG. 14, at the start of the power-supply control process, the CPU 12 executes step S31, in which to input facial image information to the face authentication circuit 58, and step S91, in which to determine whether there a plurality of authentication candidates. If "NO" in step S91, i.e. in a case where there are not a plurality of authentication candidates, the CPU 12 proceeds to step S33. If "YES" in step S91, i.e. in a case where there are a plurality of authentication candidates, the CPU 12 executes step S93, in which to set the fifth power-saving mode, step S95, in which to supply electric power to the operation panel 26, and step S97, in which to display the authentication screen 120 on the display 22.

Then, the CPU 12 executes step S99, in which to determine whether an actual user has been specified from among the plurality of authentication candidates. If "NO" in step S99, i.e. in a case where the CPU 12 has determined that no actual user is specified, the CPU 12 returns to the same step S99. On the other hand, if "YES" in step S99, i.e. in a case where the CPU 12 has determined that an actual user has been specified, the CPU 12 proceeds to step S35. In this case, the CPU 12 executes step S39, in which to determine whether the HDD 28 has stored therein registered job data registered by the actual user.

The contents of the process until step S37 and in and after step S41 are not described, as they are identical to those of the first embodiment.

The third embodiment makes it possible to appropriately achieve a reduction in power consumption by, in a case where there a plurality of registered user candidates, specifying an actual user who actually uses the image forming apparatus 10.

It should be noted that the specific configurations and the like described in the aforementioned embodiments are mere examples and are subject to change as appropriate according to actual products. Further, the orders of execution of the steps of each of the flow charts shown in the aforementioned embodiments are subject to change as appropriate, provided that the same result is obtained.

Further, although the aforementioned embodiments are configured such that the first power-saving mode is set in a case where, in the second, third, or fourth power-saving mode, it has been determined that no person has been present in the range A for a predetermined successive period of time or longer since the second power-saving mode was set, this is not intended to imply any limitation. For example, in a case where it is possible to detect, according to an output from the human detection sensor 50, a distance between the image forming apparatus 10 and a person who is present near the image forming apparatus 10, the first power-saving mode may be set in a case where, in the second, third, or fourth power-saving mode, the person is a predetermined distance or longer away from the image forming apparatus 10. In this case, a camera, an ultrasonic sensor, a laser distance sensor, or the like is used as the human detection sensor 50.

Furthermore, when, in the fourth power-saving mode, it has been determined that the HDD 28 has no registered job data stored therein, the first power-saving mode may be set.

Furthermore, even in a case where a person has entered the range A from outside the range A in the first power-saving mode, the first power-saving mode may be maintained in a case where the HDD 28 has no registered job data stored in the HDD 28. In this case, electric power is supplied to the HDD 28 in the first power-saving mode.

Further, although the aforementioned embodiments are configured to determine, by face authentication of a user, whether a user who is present in the area around the image forming apparatus 10 is a registered user, this is not intended to imply any limitation. For example, user authentication may be performed by performing radio communication between the image forming apparatus 10 and an authenticating medium that the user possesses. For example, there is a method for performing user authentication by means of Bluetooth (registered trademark) communication. In this case, the user carries a Bluetooth-communicable mobile terminal with him/her. Note, however, that an example of the mobile terminal is a portable mobile terminal such as a smartphone, a feature phone, or a tablet PC. Further, the communication circuit 62 of the image forming apparatus 10 is configured to be Bluetooth communicable. Moreover, authentication information and the MAC address of the mobile terminal are stored in association with each other. This makes it possible to, when the image forming apparatus 10 has detected a Bluetooth communication device, extract the MAC address of the device and determine whether the approaching user is a registered user. Further, there is a method for performing user authentication by means of a wireless tag. In this case, the user carries a wireless tag containing authentication information (e.g. an RF tag containing RFID) with him/her. Further, the image forming apparatus 10 includes a radio reader (e.g. an RF reader) that reads the authentication information from the wireless tag. The radio reader is connected to the CPU 12 via the bus 60. This allows the CPU 12 to, by comparing the authentication information read by the radio reader against authentication information stored in the HDD 28, determine whether the approaching user is a registered user. For example, the wireless tag may be included in a card such as an employee ID card, a wrist band, or the like or may be built in the mobile terminal that the user possesses.

The present disclosure contains subject matter related to that disclosed in Japanese Priority Patent Application JP 2017-234816 filed in the Japan Patent Office on Dec. 7, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image forming apparatus including a hard disk drive (HDD) that is able to store therein a facial image of a registered user and predetermined registered job data registered by the registered user and having a power-saving state in which an amount of power consumption is limited to a predetermined value or smaller-and a normal state in which the amount of power consumption is not limited, comprising:

a human detection sensor that detects whether a user is present in a first range within an area around the image forming apparatus;

a first determination processor that, in a case where the human detection sensor detected that a user is present in the first range, determines whether the user is the registered user;

a second determination processor that, in a case where the first determination processor has determined that the user is the registered user, determines whether the HDD has stored therein the predetermined registered job data registered by the registered user, and in a case where the HDD has not stored therein the predetermined registered job data, does not search the predetermined registered job data; and a state setting processor that sets the normal state in a case where the second determination processor has determined in the power-saving state that the HDD has stored therein the predetermined registered job data registered by the registered user, and maintains the power-saving state in a case where the second determination processor has determined in the power-saving state that the HDD has not stored therein the predetermined registered job data-registered by the registered user.

2. The image forming apparatus according to claim 1, wherein the first determination processor includes a camera that takes a photographed image including an image of a user who is present in the area around the image forming apparatus, a face detection circuit that detects a facial image of the user from the photographed image, and a face authentication circuit that, by comparing the facial image of the user detected by the face detection circuit against the facial image of the registered user, determines whether the user is the registered user.

3. The image forming apparatus according to claim 1, wherein the power-saving state includes a first power-saving state in which electric power is supplied to at least the human detection sensor, a second power-saving state in which electric power is supplied to at least the human detection sensor and the first determination processor, and a second power-saving state in which electric power is supplied to at least the human detection sensor and the third determination processor, and the state setting processor sets the second power-saving state in a case where the human detection sensor has detected in the first power-saving state that a user is present in the first range and sets the third power-saving state in a case where the first determination processor has determined that the user is the registered user.

4. The image forming apparatus according to claim 3, wherein the state setting processor sets the first power-saving state in a case where a predetermined condition has been satisfied in the second or third power-saving state.

5. The image forming apparatus according to claim 1, further comprising:

a third determination processor that determines whether a job corresponding to the registered job data is immediately executable; and an execution processor that, in a case where the third determination processor has determined that the job is immediately executable, executes the job when the normal state has been set by the state setting processor.

6. The image forming apparatus according to claim 1, wherein the state setting processor sets the normal state in a case where a predetermined start operation has been carried out in the power-saving state.

7. A non-transitory storage medium having stored thereon a control program for an image forming apparatus including a hard disk drive (HDD) section that is able to store therein a facial image of a registered user and predetermined registered job data registered by the registered user and having a power-saving state in which an amount of power consumption is limited to a predetermined value or smaller and a normal state in which the amount of power consumption is not limited, the control program causing a processor of the image forming apparatus to execute a process comprising:

(a) determining whether a user is present in a first range within an area around the image forming apparatus;

(b) in a case where, in (a), it has been determined that a user is present in the first range, determining whether the user is the registered user;

(c) in a case where, in (b), it has been determined that the user is the registered user, determining whether the HDD has stored therein the predetermined registered job data registered by the registered user, and in a case where the HDD has not stored therein the predetermined registered job data, does not search the predetermined registered job data; and (d) setting the normal state in a case where, in (c), it has been determined in the power-saving state that the HDD has stored therein the predetermined registered job data registered by the registered user, and maintaining the power-saving state in a case where, in (c), where it has been determined in the power-saving state that the HDD has not stored therein the predetermined registered job data registered by the registered user.

8. A control method by which a processor of an image forming apparatus including a hard disk drive (HDD) that is able to store therein a facial image of a registered user and predetermined registered job data registered by the registered user and having a power-saving state in which an amount of power consumption is limited to a predetermined value or smaller and a normal state in which the amount of power consumption is not limited executes a process comprising:

(a) determining whether a user is present in a first range within an area around the image forming apparatus;

(b) in a case where, in a case where, in (a), it has been determined that a user is present in the first range, determining whether the user is the registered user;

(c) in a case where, in (b), it has been determined that the user is the registered user, determining whether the HDD has stored therein the predetermined registered job data registered by the registered user, and in a case where the HDD has not stored therein the registered predetermined job data, does not search the registered predetermined job data; and (d) setting the normal state in a case where, in (c), it has been determined in the power-saving state that the HDD has stored therein the predetermined registered job data registered by the registered user, and maintaining the power-saving state in a case where, in (c), it has been determined in the power-saving state that the HDD has not stored therein the predetermined registered job data registered by the registered user.

* * * * *